United States Patent
Yang et al.

(10) Patent No.: US 11,871,328 B2
(45) Date of Patent: Jan. 9, 2024

(54) METHOD FOR IDENTIFYING SPECIFIC POSITION ON SPECIFIC ROUTE AND ELECTRONIC DEVICE

(71) Applicant: Honor Device Co., Ltd., Shenzhen (CN)

(72) Inventors: Rui Yang, Shenzhen (CN); Hui Jin, Shenzhen (CN); Fenghui Duo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 365 days.

(21) Appl. No.: 17/432,807

(22) PCT Filed: Feb. 10, 2020

(86) PCT No.: PCT/CN2020/074592
§ 371 (c)(1),
(2) Date: Aug. 20, 2021

(87) PCT Pub. No.: WO2020/168929
PCT Pub. Date: Aug. 27, 2020

(65) Prior Publication Data
US 2022/0124597 A1    Apr. 21, 2022

(30) Foreign Application Priority Data
Feb. 21, 2019 (CN) .......................... 201910129795.9

(51) Int. Cl.
*H04W 40/12* (2009.01)
*H04W 40/34* (2009.01)
*H04W 84/18* (2009.01)

(52) U.S. Cl.
CPC ........... *H04W 40/12* (2013.01); *H04W 40/34* (2013.01); *H04W 84/18* (2013.01)

(58) Field of Classification Search
CPC ...... H04W 40/12; H04W 40/34; H04W 84/18
(Continued)

(56) References Cited

U.S. PATENT DOCUMENTS 9,319,970 B2   4/2016  Liu
10,237,735 B2  3/2019  Kim et al.
(Continued)

FOREIGN PATENT DOCUMENTS

CN    102595560 A    7/2012
CN    104640224 A    5/2015
(Continued)

OTHER PUBLICATIONS

Fehske, A., et al. "Energy Efficiency Improvements through Micro Sites in Cellular Mobile Radio Networks," IEEE Globecom Workshops, 2009, 5 pages.
(Continued)

*Primary Examiner* — Faisal Choudhury
(74) *Attorney, Agent, or Firm* — Conley Rose, P.C.

(57) ABSTRACT

A method for identifying a specific location on a specific route, a daily specific route of a user may be predicted based on a daily behavior habit of the user, and a specific action related to the predicted specific route may be performed, for example, changing a network search interval; or searching for different network signals based on a network standard change; or when a terminal device runs an application, generating a message to indicate a time point at which the terminal device accesses an abnormal base station, to remind the user to cope with a network exception; or generating the message to send a cache request to a corresponding server.

20 Claims, 19 Drawing Sheets

(58) Field of Classification Search
USPC .......................................................... 370/252
See application file for complete search history.

(56) References Cited

U.S. PATENT DOCUMENTS

| | | | |
|---|---|---|---|
| 11,576,022 B2* | 2/2023 | Zhang | H04W 40/10 |
| 2015/0379993 A1 | 12/2015 | Subhojit et al. | |
| 2017/0099629 A1 | 4/2017 | Liu et al. | |
| 2017/0332344 A1 | 11/2017 | Rao et al. | |
| 2017/0373950 A1 | 12/2017 | Szilagyi et al. | |
| 2018/0062734 A1* | 3/2018 | Reynolds | H04W 24/02 |
| 2021/0168778 A1* | 6/2021 | Xia | H04W 40/12 |
| 2022/0124597 A1 | 4/2022 | Yang et al. | |

FOREIGN PATENT DOCUMENTS

| | | |
|---|---|---|
| CN | 105307240 A | 2/2016 |
| CN | 108510011 A | 9/2018 |
| CN | 109041148 A | 12/2018 |
| CN | 109104755 A | 12/2018 |
| CN | 109890067 A | 6/2019 |
| WO | 2015005686 A1 | 1/2015 |
| WO | 2016119822 A1 | 8/2016 |

OTHER PUBLICATIONS

Zhang, Y., et al., "Collaborative Fusion for Distributed Target Classification Using Evidence Theory in IOT Environment," in IEEE Access, vol. 6, Oct. 16, 2018, pp. 62314-62323.

* cited by examiner

METHOD FOR IDENTIFYING SPECIFIC POSITION ON SPECIFIC ROUTE AND ELECTRONIC DEVICE

CROSS-REFERENCE TO RELATED APPLICATIONS

This application is a U.S. National Stage of International Patent Application No. PCT/CN2020/074592 filed on Feb. 10, 2020, which claims priority to Chinese Patent Application No. 201910129795.9 filed with the China National Intellectual Property Administration on Feb. 21, 2019, both of which are incorporated herein by reference in their entirety.

TECHNICAL FIELD

This application relates to the field of electronic technologies, and in particular, to a method for identifying a specific location on a specific route, a terminal performance optimization method, and an electronic device.

BACKGROUND

In a process of using various applications (application, APP), a good network environment is usually needed. However, not all base stations can provide a relatively good network environment for an electronic device. For example, on a daily fixed route of a user, a plurality of base stations may provide network services for the user, where the plurality of base stations may include a base station with good signal quality and a base station with poor signal quality. When passing by the base station with the poor signal quality, the user may fail to use the network services.

SUMMARY

This application provides a method for identifying a specific location on a specific route, and an electronic device. The method can remind a user to cope with a network exception, so that the network exception does not affect an operation of the user, to improve user experience.

According to a first aspect, a performance optimization method is provided, which is applied to a terminal device. The terminal device stores a specific route determining model, and the specific route determining model includes information about a plurality of specific routes. The method includes: obtaining information about a current route, where the information about the current route includes information about a first wireless network set, the first wireless network set includes a first wireless network and a second wireless network, communication quality of the first wireless network is greater than a first threshold, and communication quality of the second wireless network is less than or equal to the first threshold; determining, based on the specific route determining model and the information about the current route, that the current route is a first specific route; and performing a first specific action related to the first specific route. The first specific action includes at least one of the following: changing a network search interval; or searching for different network signals based on a network standard change; or generating a first message when determining that an application currently run on the terminal device is a first application. The first message is used to indicate the terminal device to send a cache request to a server corresponding to the first application, and/or the first message is used to indicate a time point at which the terminal device accesses the second wireless network.

It should be understood that in this application, information about a route is information about a wireless network on the route, for example, information about a base station. In this application, a base station is used as an example to specifically describe a terminal performance optimization method. In this application, the first wireless network corresponds to a normal base station, and the normal base station is a base station that can provide a normal network service for the terminal device. The second wireless network corresponds to an abnormal base station. The abnormal base station may be a base station that cannot provide a network service for the terminal device. The terminal device is disconnected from a network in a coverage area of the abnormal base station, or a download rate is lower than a specific threshold, and/or a service slowly responds.

It should be further understood that an electronic device obtains the information about the current route is to obtain information about all base stations on the current route or record location information of a plurality of base stations. Optionally, information about a base station includes base station identification information or cell identification information. This is not limited in this application.

It should be further understood that the first wireless network set may include at least one base station, and the at least one base station may correspond to the normal base station and the abnormal base station in the descriptions of the embodiment. A quantity of normal base stations and a quantity of abnormal base stations included in the first wireless network set are not limited in this application.

A specific route identification method provided in this application may be used to optimize terminal performance. In different application scenarios, in processes of executing different user services, different manners may be used to notify a user of a network status, audio and a video are cached in advance, or the like, to improve user experience. The reminding manner may include a dynamic manner such as a pop-up window, or may include a static manner, for example, a configuration option is provided.

For example, when the first application run on the terminal device is a game application, the method further includes: displaying the first message in a first interface. The first interface is a running interface of the game application, and the first message is used to indicate a time point at which the terminal device performs a specific action related to the specific route.

Alternatively, when the first application run on the terminal device is an audio or video application, the method further includes: determining a time point at which the terminal device performs a specific action related to the specific route; and sending, by the terminal device based on the time point at which the terminal device performs the specific action related to the specific route, a cache request to a server corresponding to the audio or video application. The cache request is used to cache audio data or video data from the server.

In addition, in another application scenario, the terminal performance may be further optimized in another manner.

For example, optimizing terminal performance may be optimizing power consumption of a terminal device. In actual use, when the terminal device moves from a coverage area of the normal base station to the coverage area of the abnormal base station, the terminal device may be disconnected from a network. After the terminal device is disconnected from the network, the terminal device may continuously search for a network, for example, search for an accessible wireless network (2G/3G/4G) signal. According to the method provided in this embodiment of this application, the terminal device may predict, based on a specific route identification result, a time point at which the terminal device enters the coverage area of the abnormal base station and a time point at which the terminal device leaves the coverage area of the abnormal base station on the specific route, to perform any one of the following possible actions:

(1) Changing a network search interval of the terminal device.

For example, the network search interval of the terminal device is increased. Alternatively, the network search interval of the terminal device is shortened.

For example, in the coverage area of the normal base station, a network search frequency of the terminal device is once every two minutes; and in the coverage area of the abnormal base station, the network search frequency of the terminal device is changed to be once every four minutes. Power consumption of the terminal device is reduced by increasing the network search interval of the terminal device.

For example, when the terminal device is about to enter the coverage area of the normal base station, the network search interval of the terminal device may be shortened, so that the terminal device can start to search for a network in advance and quickly access the network when entering the coverage area of the normal base station, to provide a network service for a user.

(2) In a first time period, turning on a network search function of the terminal device, so that the terminal device does not keep searching for and detecting an available wireless network in the first time period, to reduce power consumption of the terminal device.

Optionally, the first time period may be a time period between the time point at which the terminal device enters the coverage area of the abnormal base station and the time point at which the terminal device leaves the coverage area of the abnormal base station. It should be understood that the first time period may not include the time point at which the terminal device leaves the abnormal base station, or the first time period may include the time point at which the terminal device leaves the abnormal base station. This is not limited in this application.

For example, the first time period is a time period between 08:30:60 and 08:35:60. In this case, the first time period does not include a time point 08:35:60 at which the terminal device leaves the abnormal base station. The terminal device predicts that the terminal device enters the normal base station at 08:35:60. Therefore, the network search function may be turned on at 08:35:60 on the terminal device, or the network search function is turned on in advance at first n seconds (for example, 08:35:50) of 08:35:60. In this way, when leaving the abnormal base station, the terminal device can access another wireless network, to shorten network disconnection time and improve user experience.

Optionally, in a process in which the terminal device enters a coverage area of a base station B from a coverage area of a base station A, there may be an area that is not covered with a wireless network. Therefore, the first time period may also be a time length of the terminal device in the area that is not covered with the wireless network.

For example, the terminal device is within the coverage area of the base station A between 08:30:60 and 08:35:60, the terminal device is within the area that is not covered with the wireless network between 08:35:60 and 08:38:60, and the terminal device is within the coverage area of the base station B between 08:38:60 and 08:40:60. Therefore, the first time period is between 08:35:60 and 08:38:60. In this time period, a network search function of the terminal device may be turned off, to reduce power consumption of the terminal device. When the terminal device leaves the area that is not covered with the wireless network and enters the base station B at 08:38:60, the network search function of the terminal device may be turned on in advance. For example, the terminal device re-searches for a network in advance at 08:38:50. When entering the base station B, the terminal device can quickly access the base station B, to improve user experience. This is not limited in this application.

For example, optimizing terminal performance may further be that the terminal device quickly obtains a network service. In actual use, after the terminal device enters the coverage area of the abnormal base station and is disconnected from a network, the terminal device may continuously search for a network, for example, search for an accessible wireless network (2G/3G/4G) signal. According to the method provided in this embodiment of this application, the terminal device may obtain information about base stations on the specific route based on a specific route identification result.

For example, when the terminal device is handed over from the base station A to the base station B, the terminal device may learn of a network standard change. For example, switching between high and low network standards, from 2G to 3G, from 3G to 4G, or future 5G, or the like.

For example, the terminal device may learn that the base station A provides a 4G network for the terminal device on the specific route, and the base station B can provide only a 3G network for the terminal device. At a time point at which the terminal device determines to hand over from the base station A to the base station B, the terminal device directly searches for a 3G network signal without a need of simultaneously searching for a network signal provided by another different network standard, for example, a 2G/4G/5G network signal.

Alternatively, for example, the terminal device may predict a time point at which the terminal device enters the coverage area of the abnormal base station from the coverage area of the normal base station and the time point at which the terminal device leaves the coverage area of the abnormal base station on the specific route. In addition, the terminal device may learn that the normal base station can provide a 5G network for the terminal device, and the abnormal base station can provide only a 2G network for the terminal device. Therefore, when entering the coverage area of the abnormal base station from the coverage area of the normal base station, the terminal device directly searches for a 2G network signal that can be provided by the abnormal base station, and does not need to simultaneously search for a network signal provided by another different network standard. For example, the terminal device is prohibited from searching for a network signal in a network standard such as a 4G/3G/5G network. In this way, the terminal device can quickly obtain a network service.

With reference to the first aspect, in some implementations of the first aspect, the method further includes: determining the specific route determining model. Each of the plurality of specific routes includes information about a second wireless network set, and the second wireless network set includes at least one wireless network.

With reference to the first aspect and the foregoing implementations, in some implementations of the first aspect, the determining the specific route determining model includes: obtaining information about wireless networks included in second wireless network sets on the plurality of specific routes; constructing a first feature matrix of the plurality of specific routes based on the obtained information about the wireless networks included in the second wireless network sets on the plurality of specific routes; performing classification processing on the plurality of specific routes based on the first feature matrix, to obtain a second feature matrix; and determining the specific route determining model based on the second feature matrix.

With reference to the first aspect and the foregoing implementations, in some implementations of the first aspect, the constructing a first feature matrix of the plurality of specific routes includes: obtaining a matching feature curve of any two specific routes of the plurality of specific routes through sliding correlation coefficient calculation; and constructing the first feature matrix based on the matching feature curve. The sliding correlation coefficient calculation includes a hard-decision calculation or a soft-decision calculation.

With reference to the first aspect and the foregoing implementations, in some implementations of the first aspect, the method further includes: classifying any one of the plurality of specific routes based on a k-nearest neighbor algorithm and the first feature matrix.

It should be understood that, in an autonomous clustering process of an original feature matrix, there may be two specific routes whose similarities are close to each other. In other words, according to the foregoing autonomous clustering process, the two specific routes may be classified into either of the two specific routes. To classify the routes accurately, KNN algorithm clustering processing is performed on the original feature matrix.

With reference to the first aspect and the foregoing implementations, in some implementations of the first aspect, the determining, based on the specific route determining model and the information about the current route, that the current route is a first specific route includes: obtaining the information about the wireless network included in the second wireless network set included in each specific route in the specific route determining model; and determining that the current route is the first specific route when determining that a degree at which the information about the wireless network included in the second wireless network set matches information about a wireless network included in the first wireless network set is greater than or equal to a second threshold.

With reference to the first aspect and the foregoing implementations, in some implementations of the first aspect, the obtaining the information about the wireless network included in the second wireless network set included in the specific route determining model includes: periodically obtaining the information about the wireless network included in the second wireless network set.

Optionally, downsampling is a manner in which information about a learned specific route is periodically obtained. In addition, the downsampling can reduce an operation amount of the electronic device. For example, generally, sampling may be performed once every second, but the downsampling may be performed once every two seconds. On the premise that identification accuracy is not affected, a calculation amount of the electronic device can be reduced by reducing a sampling frequency, to reduce power consumption.

With reference to the first aspect and the foregoing implementations, in some implementations of the first aspect, the information about the wireless network includes base station identification information and/or cell identification information.

According to a second aspect, an electronic device is provided, including: one or more processors, a memory, a plurality of applications, and one or more programs, where the one or more programs are stored in the memory. When the one or more programs are executed by the processor, the electronic device is enabled to perform the following steps: obtaining information about a current route, where the information about the current route includes information about a first wireless network set, the first wireless network set includes a first wireless network and a second wireless network, communication quality of the first wireless network is greater than a first threshold, and communication quality of the second wireless network is less than or equal to the first threshold; determining, based on the specific route determining model and the information about the current route, that the current route is a first specific route; and performing a first specific action related to the first specific route. The first specific action includes at least one of the following: changing a network search interval; or searching for different network signals based on a network standard change; or generating a first message when determining that an application currently run on a terminal device is a first application. The first message is used to indicate the terminal device to send a cache request to a server corresponding to the first application, and/or the first message is used to indicate a time point at which the terminal device accesses the second wireless network.

With reference to the second aspect, in some implementations of the second aspect, when the one or more programs are executed by the processor, the electronic device is enabled to perform the following step: determining the specific route determining model. Each of the plurality of specific routes includes information about a second wireless network set, and the second wireless network set includes at least one wireless network.

With reference to the second aspect and the foregoing implementations, in some implementations of the second aspect, when the one or more programs are executed by the processor, the electronic device is enabled to perform the following steps: obtaining information about wireless networks included in second wireless network sets on the plurality of specific routes; constructing a first feature matrix of the plurality of specific routes based on the obtained information about the wireless networks included in the second wireless network sets on the plurality of specific routes; performing classification processing on the plurality of specific routes based on the first feature matrix, to obtain a second feature matrix; and determining the specific route determining model based on the second feature matrix.

With reference to the second aspect and the foregoing implementations, in some implementations of the second aspect, when the one or more programs are executed by the processor, the electronic device is enabled to perform the following steps: obtaining a matching feature curve of any two specific routes of the plurality of specific routes through sliding correlation coefficient calculation; and constructing the first feature matrix based on the matching feature curve. The sliding correlation coefficient calculation includes a hard-decision calculation or a soft-decision calculation.

With reference to the second aspect and the foregoing implementations, in some implementations of the second aspect, when the one or more programs are executed by the processor, the electronic device is enabled to perform the following step: classifying any one of the plurality of specific routes based on a k-nearest neighbor algorithm and the first feature matrix.

With reference to the second aspect and the foregoing implementations, in some implementations of the second aspect, when the one or more programs are executed by the processor, the electronic device is enabled to perform the following steps: obtaining the information about the wireless network included in the second wireless network set included in each specific route in the specific route determining model; and determining that the current route is the first specific route when determining that a degree at which the information about the wireless network included in the second wireless network set matches information about a wireless network included in the first wireless network set is greater than or equal to a second threshold.

With reference to the second aspect and the foregoing implementations, in some implementations of the second aspect, when the one or more programs are executed by the processor, the electronic device is enabled to perform the following step: periodically obtaining the information about the wireless network included in the second wireless network set.

With reference to the second aspect and the foregoing implementations, in some implementations of the second aspect, the information about the wireless network includes base station identification information and/or cell identification information.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware by executing corresponding software. The hardware or the software includes one or more modules or units corresponding to the foregoing function, for example, a display module or unit, a detection module or unit, or a processing module or unit.

According to a fourth aspect, this application provides an electronic device, including a touch display, a camera, one or more processors, one or more memories, a plurality of applications, and one or more computer programs, where the touch display includes a touch-sensitive surface and a display, the one or more computer programs are stored in the memory, and the one or more computer programs include instructions. When the instructions are executed by the one or more processors, the electronic device is enabled to perform the method according to any possible implementation of any one of the foregoing aspects.

According to a fifth aspect, this application provides an electronic device, including one or more processors and one or more memories. The one or more memories are coupled to the one or more processors, the one or more memories are configured to store computer program code, and the computer program code includes computer instructions. When the one or more processors execute the computer instructions, the electronic device is enabled to perform the method according to any possible implementation of any one of the foregoing aspects.

According to a sixth aspect, this application provides a computer storage medium, including computer instructions. When the computer instructions are run on an electronic device, the electronic device is enabled to perform any possible method according to any one of the foregoing aspects.

According to a seventh aspect, this application provides a computer program product. When the computer program product is run on an electronic device, the electronic device is enabled to perform any possible method according to any one of the foregoing aspects.

DESCRIPTION OF EMBODIMENTS

Figure 1:
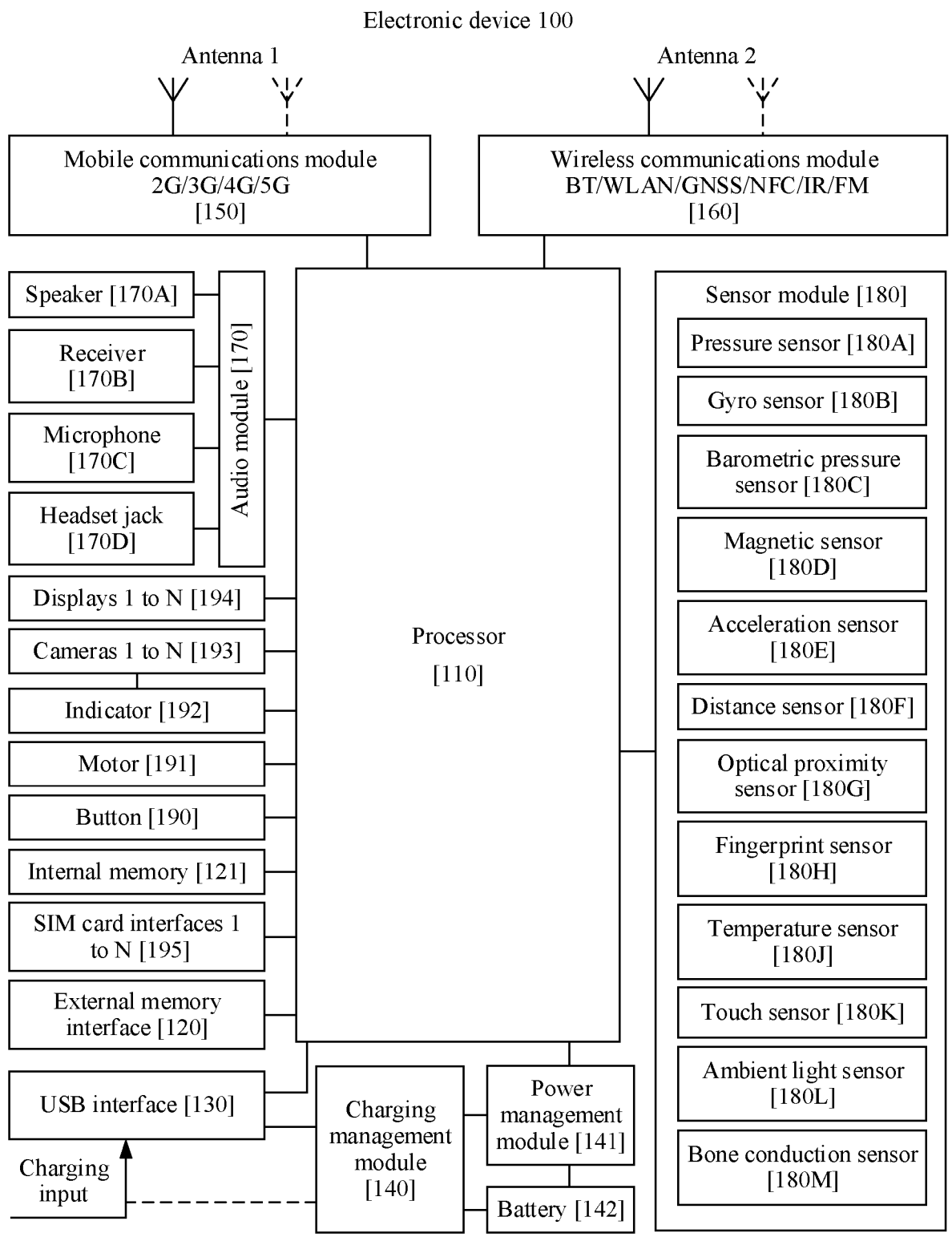
FIG. 1 is a schematic diagram of a hardware structure of an electronic device according to an embodiment of this application.

The following describes the technical solutions in the embodiments of this application with reference to the accompanying drawings in the embodiments of this application. In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

The following terms "first" and "second" are only intended for a purpose of description, and shall not be understood as an indication or implication of relative importance or implicit indication of a quantity of indicated technical features. Therefore, a feature limited by "first" or "second" may explicitly or implicitly include one or more features. For example, a first feature matrix and a second feature matrix in this application are merely used to represent different processing results obtained in different feature matrix processing phases. In descriptions of this embodiment, unless otherwise specified, "a plurality of" means two or more than two.

An embodiment of this application provides a method for identifying a specific location on a specific route. The method may be applied to an electronic device or an independent application, and the application may implement the method for identifying the specific location on the specific route in this application. Specifically, the electronic device may predict a daily specific route of the user based on a daily behavior habit of a user, and determine the daily specific route of the user and information about a plurality of base stations that the electronic device accesses on a specific route. When a base station with a relatively poor signal exists on the daily specific route, the electronic device may first predict a time point at which the electronic device reaches the base station, and then send a cache request to a server in advance with reference to a feature of an APP that is run on the electronic device, to prevent use of the user from being affected when the electronic device accesses the base station with the relatively poor signal, or notify, in a message form, the user of the time point at which the electronic device reaches the base station, to remind the user to cope with a network exception.

The method for identifying the specific location on the specific route, provided in this embodiment of this application, may be applied to electronic devices such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). A specific type of the electronic device is not limited in this embodiment of this application.

For example, FIG. 1 is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include components more or fewer than those shown in the figure, or some components may be combined, or some components may be split, or there may be a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

In this embodiment of this application, the processor 110 may be configured to: determine a specific route determining model, and determine, based on the specific route determining model, which specific route is a current route, to predict locations of base stations on the specific route, and time points at which the electronic device accesses a plurality of base stations included in the specific route. In addition, the processor 110 may be further configured to: determine a type of an application currently run on the electronic device, and determine whether the electronic device needs to request a server to cache audio data, video data, and the like.

The I2C interface is a bidirectional synchronous serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using an I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication to sample, quantize, and encode an analog signal. In some embodiments, the audio module 170 and the wireless communications module 160 may be coupled through a PCM bus interface. In some embodiments, the audio module 170 may also transmit an audio signal to the wireless communications module 160 through the PCM interface, to implement a function of answering a call by using the Bluetooth headset. Both the I2S interface and the PCM interface may be used for audio communication.

The UART interface is a universal serial data bus, and is used for asynchronous communication. The bus may be a bidirectional communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be alternatively configured as an I2C interface, an I2S interface, a UART interface, an MIPI interface, or the like.

The USB interface 130 is an interface that complies with a USB standard specification, and may be specifically a mini USB interface, a micro USB interface, a USB Type C interface, or the like. The USB interface 130 may be configured to connect to the charger to charge the electronic device 100, or may be configured to transmit data between the electronic device 100 and a peripheral device, or may be configured to connect to a headset to play audio through the headset. This interface may be further configured to connect to another electronic device such as an AR device.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 supplies power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and through the antenna 1, convert the amplified signal into an electromagnetic wave and radiate the electromagnetic wave. In some embodiments, at least some function modules of the mobile communications module 150 may be disposed in the processor 110. In some embodiments, at least some function modules of the mobile communications module 150 and at least some modules of the processor 110 may be disposed in a same component.

In this embodiment of this application, when the processor 110 determines that cache data needs to be requested from the server, the mobile communications module 150 may send a request message to the server, to request data cache. In addition, the mobile communications module 110 may be further configured to detect a base station signal and the like.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits, to the baseband processor for processing, the low-frequency baseband signal obtained through demodulation. The low-frequency baseband signal is transmitted to the application processor after being processed by the baseband processor. The application processor outputs a sound signal through an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and be disposed in a same component as the mobile communications module 150 or another function module.

The wireless communications module 160 may provide wireless communication solutions that are applied to the electronic device 100, for example, wireless local area network (wireless local area networks, WLAN) (for example, a wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), infrared (infrared, IR) technologies. The wireless communications module 160 may be one or more components integrated with at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and through the antenna 2, convert the signal into an electromagnetic wave and radiate the electromagnetic wave.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 implements the display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute program instructions to generate or change display information.

The display 194 is configured to display an image, a video, or the like. The display 194 includes a display panel. The display panel may use a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a Miniled, a MicroLed, a Micro-oled, quantum dot light emitting diodes (quantum dot light emitting diodes, QLED), or the like. In some embodiments, the electronic device 100 may include one or N displays 194, where N is a positive integer greater than 1.

The electronic device 100 may implement the photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on image noise, brightness, and complexion. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy or the like.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, with reference to a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external memory card such as a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and a phone book) created when the electronic device 100 is used, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or a voice information is received by using the electronic device 100, the receiver 170B may be put close to a human ear to listen to the voice.

The microphone 170C, also referred to as a "mike" or a "voice tube", is configured to convert a sound signal into an electrical signal. When making a call or sending voice information, a user may speak through the mouth close to the microphone 170C, to input a sound signal into the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may be alternatively disposed in the electronic device 100, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates with conductive materials. When force is applied to the pressure sensor 180A, capacitance between electrodes changes. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on an SMS message application icon, an instruction for viewing an SMS message is executed; or when a touch operation whose touch operation strength is greater than or equal to the first pressure threshold is performed on the SMS message application icon, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be used for image stabilization during photographing. For example, when the shutter is pressed, the gyro sensor 180B detects a shaking angle of the electronic device 100, calculates, based on the angle, a distance for which a lens module needs to compensate, and allows the lens to eliminate the shaking of the electronic device 100 through reverse motion, to implement image stabilization. The gyro sensor 180B may also be used in navigation and motion sensing game scenarios.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations of the electronic device 100 in all directions (usually on three axes), may detect magnitude and a direction of gravity when the electronic device 100 is static, may be further configured to identify a posture of the electronic device, is applied to switching between a landscape mode and a portrait mode, and is applied to applications such as a pedometer.

The distance sensor 180F is configured to measure a distance. The electronic device 100 may measure the distance through infrared or laser. In some embodiments, in a photographing scenario, the electronic device 100 may measure a distance by using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor close to the temperature sensor 180J, to reduce power consumption and implement thermal protection. In some other embodiments, when the temperature is lower than another threshold, the electronic device 100 heats the battery 142 to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen that is also referred to as a "touchscreen". The touch sensor 180K is configured to detect a touch operation performed on or near the touch sensor 180K. The touch sensor may transfer the detected touch operation to the application processor to determine a touch event type. Visual output related to the touch operation may be provided through the display 194. In some other embodiments, the touch sensor 180K may be alternatively disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part of a human body. The bone conduction sensor 180M may also be in contact with a human body pulse to receive a blood pressure beating signal. In some embodiments, the bone conduction sensor 180M may be alternatively disposed in the headset, to be combined with the headset to form a bone conduction headset. The audio module 170 may obtain, based on the vibration signal that is of the vibration bone of the vocal-cord part and that is obtained by the bone conduction sensor 180M, a voice signal through parsing, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 can support one or N SIM card interfaces, where N is a positive integer greater than 1. The SIM card interface 195 can support a nano-SIM card, a micro-SIM card, a SIM card, and the like. A plurality of cards can be simultaneously inserted into the same SIM card interface 195. The plurality of cards may be of a same type, or may be of different types. The SIM card interface 195 may also be compatible with different types of SIM cards. The SIM card interface 195 can also be compatible with an external memory card. The electronic device 100 interacts with a network by using the SIM card, to implement a call function, a data communication function, and the like. In some embodiments, the electronic device 100 uses an eSIM, namely, an embedded SIM card. The eSIM card may be embedded in the electronic device 100 and cannot be separated from the electronic device 100.

A software system of the electronic device 100 may use a hierarchical architecture, an event-driven architecture, a microkernel architecture, a microservice architecture, or a cloud architecture. In this embodiment of this application, an Android system with the hierarchical architecture is used as an example to describe a software structure of the electronic device 100.

Figure 2:
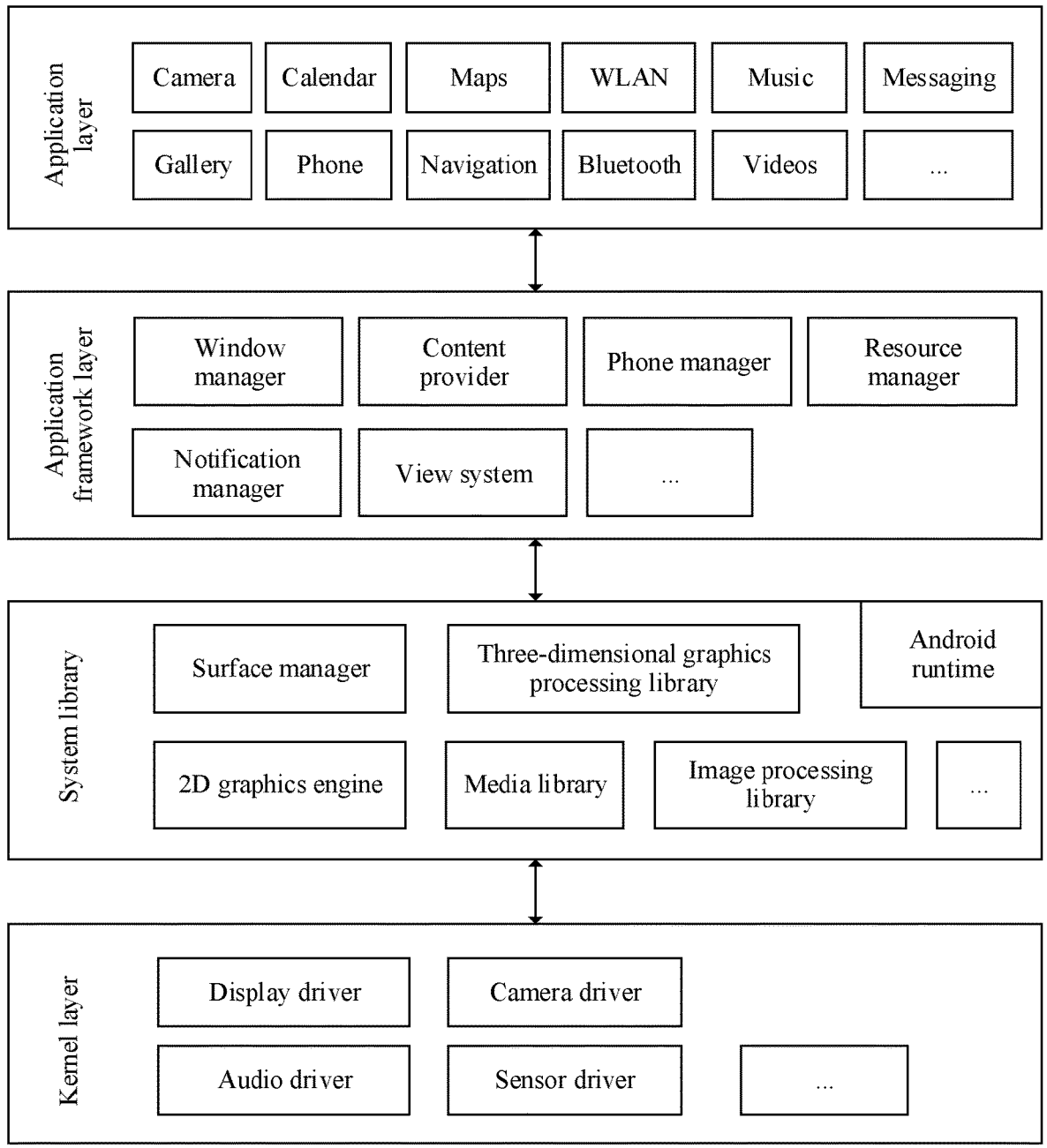
FIG. 2 is a schematic diagram of a software structure of an electronic device according to an embodiment of this application.

FIG. 2 is a block diagram of the software structure of the electronic device 100 according to this embodiment of this application. In a hierarchical architecture, software is divided into several layers, and each layer has a clear role and responsibility. The layers communicate with each other through a software interface. In some embodiments, an Android system is divided into four layers, namely, an application layer, an application framework layer, an Android runtime (Android runtime), a system library, and a kernel layer from top to bottom. The application layer may include a series of application packages.

As shown in FIG. 2, the application packages may include applications such as "camera", "gallery", "calendar", "phone", "maps", "navigation", "WLAN", "Bluetooth", "music", "videos", and "messaging".

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data and enable the data to be accessible to an application. The data may include a video, an image, audio, dialed and answered calls, browsing history, a bookmark, a phone book, and the like.

The view system includes visual controls, such as a text display control and a picture display control. The view system may be configured to construct an application. A display interface may include one or more views. For example, a display interface including an SMS notification icon may include a text display view and a picture display view.

The phone manager is configured to provide a communication function of the electronic device 100, for example, management of a call status (including answering, declining, and the like).

The resource manager provides, for an application, various resources such as a localized character string, an icon, a picture, a layout file, and a video file.

The notification manager enables an application to display notification information in the status bar, and may be used to transmit a notification-type message. The displayed information may automatically disappear after a short pause without user interaction. For example, the notification manager is configured to notify download completion, give a message notification, and the like. The notification manager may alternatively be a notification that appears in the status bar at the top of a system in a form of a chart or a scroll bar text, for example, a notification of an application that is run on a background, or may be a notification that appears on the screen in a form of a dialog window. For example, text information is prompted in the status bar, a prompt tone is produced, the electronic device vibrates, or an indicator light blinks.

In this application, the electronic device first determines a time point at which the electronic device is to access an abnormal base station, and then may display, in a form of notification information in the status bar, a time point at which the electronic device accesses the abnormal base station, to remind a user to cope with a case such as a network exception.

Android runtime includes a kernel library and a virtual machine. The Android runtime is responsible for Android system scheduling and management.

The kernel library includes two parts: one part is a performance function that needs to be invoked by Java language, and the other part is an Android kernel library.

The application layer and the application framework layer run in the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem, and provides fusion of 2D and 3D layers for a plurality of applications.

The media library supports playback and recording of a plurality of common audio and video formats, a static image file, and the like. The media library may support a plurality of audio and video encoding formats such as MPEG-4, H.264, MP3, AAC, AMR, JPG, and PNG.

The three-dimensional graphics processing library is used to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an electronic device having the structures shown in FIG. 1 and FIG. 2 is used as an example to describe in detail, with reference to the accompanying drawings and application scenarios, the method for rereading a word in a video provided in this embodiment of this application.

Figure 3:
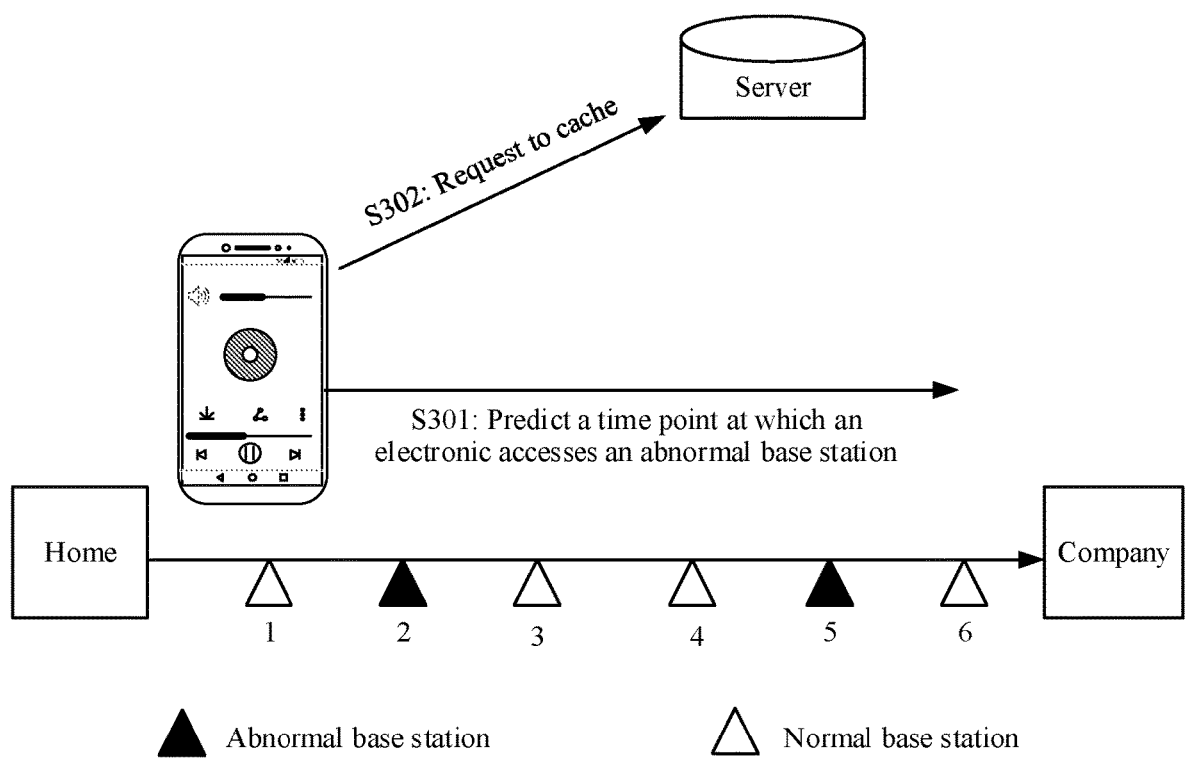
FIG. 3 is a schematic diagram of an example of route identification according to this application.

FIG. 3 is a schematic diagram of an example of specific route identification according to this application. As shown in FIG. 3, a route from home to a company includes six different base stations such as base stations respectively shown by small triangles in the figure. Base stations 1, 3, 4, and 6 respectively shown by small white triangles are normal base stations. When a user passes by a coverage area of a normal base station, an electronic device can normally access a base station, and the base station can provide a network service for the user. Base stations 2 and 5 respectively shown by small black triangles are abnormal base stations. When the user passes by a coverage area of an abnormal base station, the electronic device cannot normally access a base station and is in a network disconnection state or a poor network signal state, and a network service is abnormal. In this case, the user cannot normally use an online service of an application, for example, an online application of online audio, an online video, or the like. To avoid affecting normal use of the online application of the online audio, the online video, or the like by the user, and improve user experience, the electronic device may predict a daily specific route of the user based on a daily behavior habit of the user, and determine the daily specific route of the user and information about a plurality of base stations that the electronic device accesses on the specific route. When a base station with a relatively poor signal exists on the daily specific route, the electronic device may first predict a time point at which the electronic device reaches the base station, and then send a cache request to a server in advance with reference to a feature of an APP that is run on the electronic device, to prevent use of the user from being affected when the electronic device accesses the base station with the relatively poor signal, or notify, in a message form, the user of the time point at which the electronic device reaches the base station, to remind the user to cope with a network exception.

Specifically, the foregoing process may include the following steps: S301: The electronic device predicts a time point at which the electronic device accesses an abnormal base station. S302: Before the time point at which the electronic device accesses the abnormal base station arrives, the electronic device sends a request to the server, to cache data in advance.

It should be understood that in this application, an audio application or a video application is used as an example to describe a mechanism in which the electronic device predicts a route of the user and caches the data in advance. For example, a display interface of the electronic device in FIG. 3 is a schematic diagram of a possible display interface in an audio playing process. In this application, the electronic device may alternatively run another application, for example, an application type such as a video that needs to cache data, or another online application type.

When running the audio application or the video application, the electronic device may predict the route of the user, predict a time point at which the electronic device accesses an abnormal base station on the route, and send a request to a server in advance before the time point arrives, to cache audio or video data. When the electronic device accesses the abnormal base station, the audio or video data cached in advance may be used by the user, so that a network exception does not affect an operation of the user. Therefore, user experience can be improved by using the method.

For example, an interface of the electronic device shown in FIG. 3 is an audio play interface, and it indicates that the electronic device is currently playing an audio file. The user starts from the home. In a coverage area of the base station 1, the electronic device predicts that a specific route selected by the user is the route from the home to the company, may access the abnormal base station 2 and the abnormal base station 5 on the specific route, and determines time points at which the electronic device separately accesses the abnormal base station 2 and the abnormal base station 5. Before reaching a coverage area of the base station 2, the electronic device sends a request to the server, to request to cache more audio data.

In a possible implementation, the foregoing mechanism for predicting a route and a network status in advance may be further applied to another application scenario.

Figure 4A:
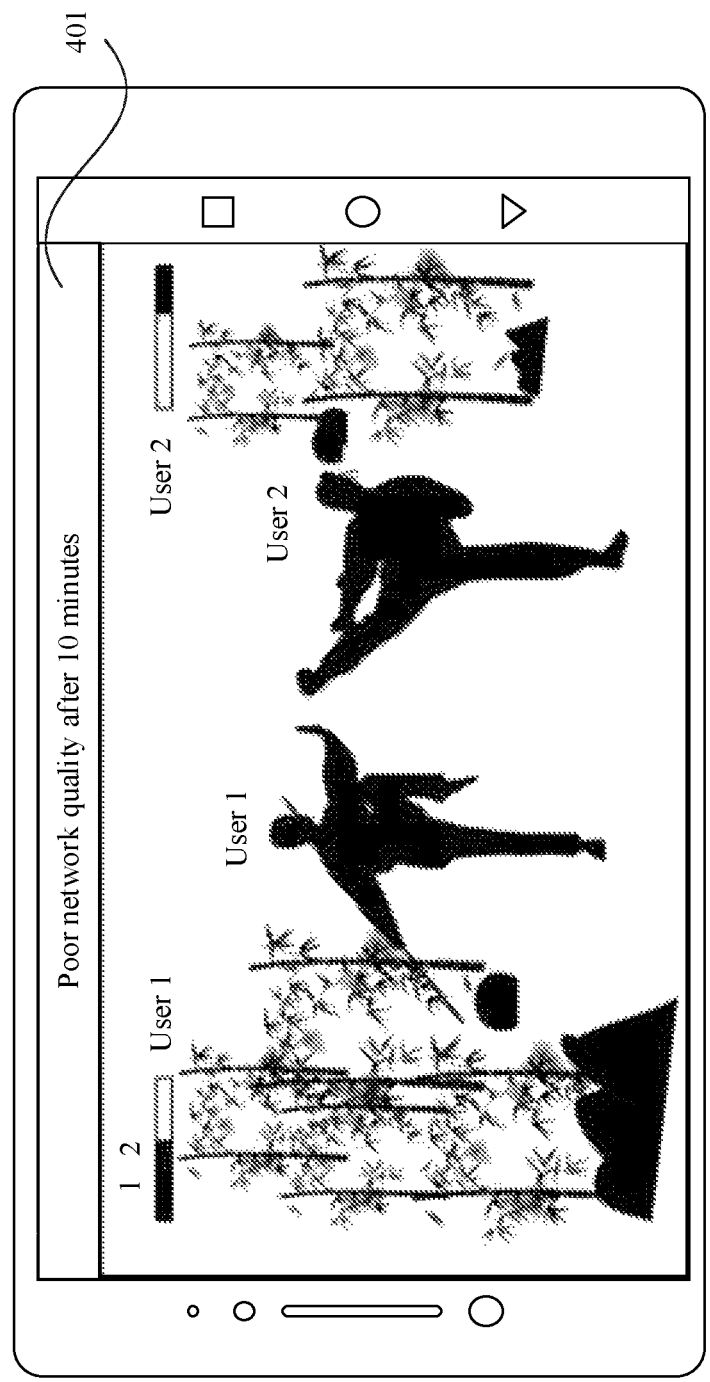
FIG. 4(a) and FIG. 4(b) are a schematic diagram of a plurality of possible application scenarios according to this application.
Figure 4B:
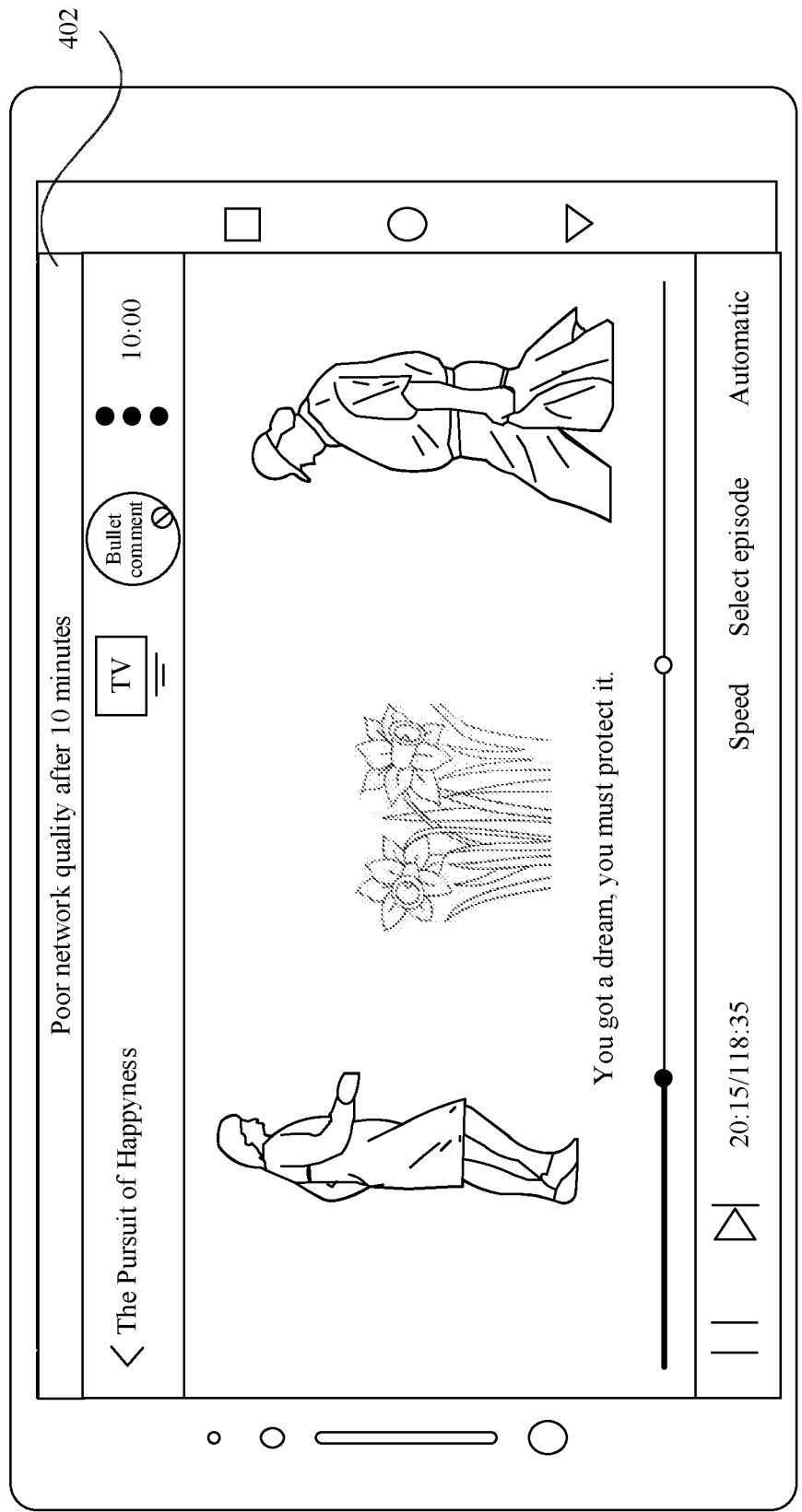

FIG. 4(*a*) and FIG. 4(*b*) are a schematic diagram of a plurality of possible application scenarios according to this application. Specifically, FIG. 4(*a*) shows a schematic diagram of a scenario in which an electronic device runs a game application. When an online game application is run by a user, an electronic device predicts, based on a current moving speed of the user, a time point at which the electronic device accesses a base station with relatively poor communication quality on the specific route, and generates a message in advance. The message is used to notify the user that a network is to deteriorate after a specific time length, so that the user takes a corresponding measure. The message may be used to remind the user in a form of a message pop-up window 401 shown in FIG. 4(*a*). Content of the message pop-up window 401 may be "Poor network quality after 10 minutes", or may be more message content used to remind the user that the network quality deteriorates. The content of the message pop-up window is not limited in this application.

When a moving speed of a user changes, to cause a change of the time point at which the electronic device accesses the base station with the relatively poor communication quality, a notification message may be correspondingly changed. For example, when the user starts to be in a driving mode, the electronic device reminds the user at 08:30 of "Poor network quality after 10 minutes". At 08:35, the electronic device determines that the user is in a walking mode, and the time point at which the electronic device accesses the base station with the relatively poor communication quality changes from originally predicted 08:40 to 08:55. In this case, the notification message may be changed to "Poor network quality after 20 minutes", and is displayed in a form of the message pop-up window again.

Optionally, when the electronic device runs a video playing application shown in FIG. 4(*b*), the electronic device predicts a time point at which the electronic device accesses a base station with relatively poor communication quality on the specific route, and the electronic device may send a request to a server, to request to cache video data. More cache progress can be displayed on a play progress bar on a video display interface. For example, on the play progress bar in FIG. 4(*b*), a black solid line indicates a film that has been watched by the user, and a black solid point indicates a current playing position. After the electronic device sends the cache request to the server, the cache progress of the film may reach a position shown by a hollow dot.

In a possible case, a time length between the playing position indicated by the black solid point and the playing position indicated by the hollow dot is greater than or equal to a time length between a current time point and a time point at which the user leaves a coverage area of an abnormal base station. This ensures that online video watching by the user is not affected when the user accesses the abnormal base station.

Alternatively, the electronic device may generate a message in advance, for example, a message pop-up window 402. Content of the message pop-up window 402 is used to notify the user that a network is to deteriorate after a specific time length, so that the user takes a corresponding measure. This is not limited in this application.

A specific route identification method provided in this application may be used to optimize terminal performance. With reference to the two application scenarios listed in FIG. 4(a) and FIG. 4(b), in a process of performing different user services, a user network status is notified in different manners, or audio, video, or the like is cached in advance, to improve user experience. The reminding manner may include a dynamic manner such as a pop-up window, or may include a static manner, for example, a configuration option is provided. In addition, in another application scenario, the terminal performance may be further optimized in another manner.

For example, optimizing terminal performance may be optimizing power consumption of a terminal device. In actual use, when the terminal device moves from a coverage area of a normal base station to a coverage area of an abnormal base station, the terminal device may be disconnected from a network. After the terminal device is disconnected from the network, the terminal device may continuously search for a network, for example, search for an accessible wireless network (2G/3G/4G) signal. According to the method provided in this embodiment of this application, the terminal device may predict, based on a specific route identification result, a time point at which the terminal device enters the coverage area of the abnormal base station and a time point at which the terminal device leaves the coverage area of the abnormal base station on the specific route, to perform any one of the following possible actions:

(1) Change a network search interval of the terminal device.

For example, the network search interval of the terminal device is increased; or the network search interval of the terminal device is shortened.

For example, in the coverage area of the normal base station, a network search frequency of the terminal device is once every two minutes; and in the coverage area of the abnormal base station, the network search frequency of the terminal device is changed to be once every four minutes. Power consumption of the terminal device is reduced by increasing the network search interval of the terminal device.

For example, when the terminal device is about to enter the coverage area of the normal base station, the network search interval of the terminal device may be shortened, so that the terminal device can start to search for a network in advance and quickly access the network when entering the coverage area of the normal base station, to provide a network service for a user.

(2) In a first time period, turn on a network search function of the terminal device, so that the terminal device does not keep searching for and detecting an available wireless network in the first time period, to reduce power consumption of the terminal device.

Optionally, the first time period may be a time period between the time point at which the terminal device enters the coverage area of the abnormal base station and the time point at which the terminal device leaves the coverage area of the abnormal base station. It should be understood that the first time period may not include the time point at which the terminal device leaves the abnormal base station, or the first time period may include the time point at which the terminal device leaves the abnormal base station. This is not limited in this application.

For example, the first time period is a time period between 08:30:60 and 08:35:60. In this case, the first time period does not include a time point 08:35:60 at which the terminal device leaves the abnormal base station. The terminal device predicts that the terminal device enters the normal base station at 08:35:60. Therefore, the terminal device may turn on the network search function at 08:35:60, or turn on the network search function in advance at first n seconds (for example, 08:35:50) of 08:35:60. In this way, when leaving the abnormal base station, the terminal device can access another wireless network, to shorten network disconnection time and improve user experience.

Optionally, in a process in which the terminal device enters a coverage area of a base station B from a coverage area of a base station A, there may be an area that is not covered with a wireless network. Therefore, the first time period may also be a time length of the terminal device in the area that is not covered with the wireless network.

For example, the terminal device is within the coverage area of the base station A between 08:30:60 and 08:35:60, the terminal device is within the area that is not covered with the wireless network between 08:35:60 and 08:38:60, and the terminal device is within the coverage area of the base station B between 08:38:60 and 08:40:60. Therefore, the first time period is between 08:35:60 and 08:38:60. In this time period, a network search function of the terminal device may be turned off, to reduce power consumption of the terminal device. When the terminal device leaves the area that is not covered with the wireless network and enters the base station B at 08:38:60, the network search function of the terminal device may be turned on in advance. For example, the terminal device re-searches for a network in advance at 08:38:50. When entering the base station B, the terminal device can quickly access the base station B, to improve user experience. This is not limited in this application.

For example, optimizing terminal performance may further be that the terminal device quickly obtains a network service. In actual use, after the terminal device enters the coverage area of the abnormal base station and is disconnected from a network, the terminal device may continuously search for a network, for example, search for an accessible wireless network (2G/3G/4G) signal. According to the method provided in this embodiment of this application, the terminal device may obtain information about base stations on the specific route based on a specific route identification result.

For example, when the terminal device is handed over from the base station A to the base station B, the terminal device may learn of a network standard change. For example, switching between high and low network standards, from 2G to 3G, from 3G to 4G, or future 5G, or the like.

For example, the terminal device may learn that the base station A provides a 4G network for the terminal device on the specific route, and the base station B can provide only a 3G network for the terminal device. At a time point at which the terminal device determines to hand over from the base station A to the base station B, the terminal device directly searches for a 3G network signal without a need of simultaneously searching for a network signal provided by another different network standard, for example, a 2G/4G/5G network signal.

Alternatively, for example, the terminal device may predict a time point at which the terminal device enters the coverage area of the abnormal base station from the coverage area of the normal base station and the time point at which the terminal device leaves the coverage area of the abnormal base station on the specific route. In addition, the terminal device may learn that the normal base station can provide a 5G network for the terminal device, and the abnormal base station can provide only a 2G network for the terminal device. Therefore, when entering the coverage area of the abnormal base station from the coverage area of the normal base station, the terminal device directly searches for a 2G network signal that can be provided by the abnormal base station, and does not need to simultaneously search for a network signal provided by another different network standard. For example, the terminal device is prohibited from searching for a network signal in a 4G/3G/5G network standard, or the like. In this way, the terminal device can quickly obtain a network service.

To implement the foregoing functions, the electronic device first needs to accurately predict a specific route that the user passes by. In a user route determining process, the electronic device needs to learn of information about the specific route that the user passes by, and identify a current route on which the user is located, to select a corresponding prediction model for the route.

Figure 5:
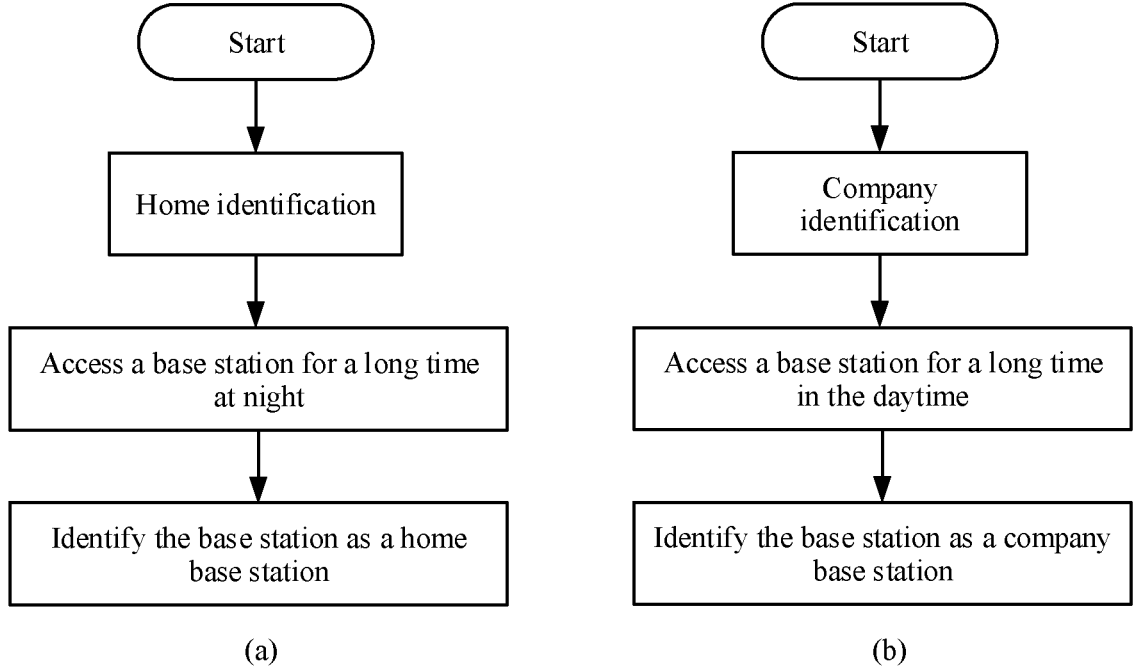
FIG. 5 is a flowchart of an example of route identification by using an electronic device.

Currently, in a specific route identification method by using an electronic device, route identification is performed mainly based on timestamp information. Specifically, FIG. 5 is a flowchart of an example of route identification by using an electronic device. As shown in FIG. 5, scenario determining is first performed based on information about a time point at which the electronic device accesses a base station, where a scenario is mainly determined to be a base station near a home and a base station near a company. A figure (a) in FIG. 5 shows a process in which the electronic device determines a base station near a home, and a figure (b) shows a process in which the electronic device determines a base station near a company. In the identification method, the electronic device identifies a base station accessed for a long time at night as the base station near the home, and records timestamp information at which the electronic device accesses the base station near the home at night. A base station accessed for a long time in the daytime is identified as the base station near the company, and the electronic device records timestamp information at which the electronic device accesses the base station near the company in the daytime. In this way, the electronic device may identify, based on the time stamp information and with reference to information about base stations, a route through which the electronic device leaves the base station near the home in the daytime as a route to work, and a route through which the electronic device leaves the base station near the company at night as an off-work route.

Figure 6:
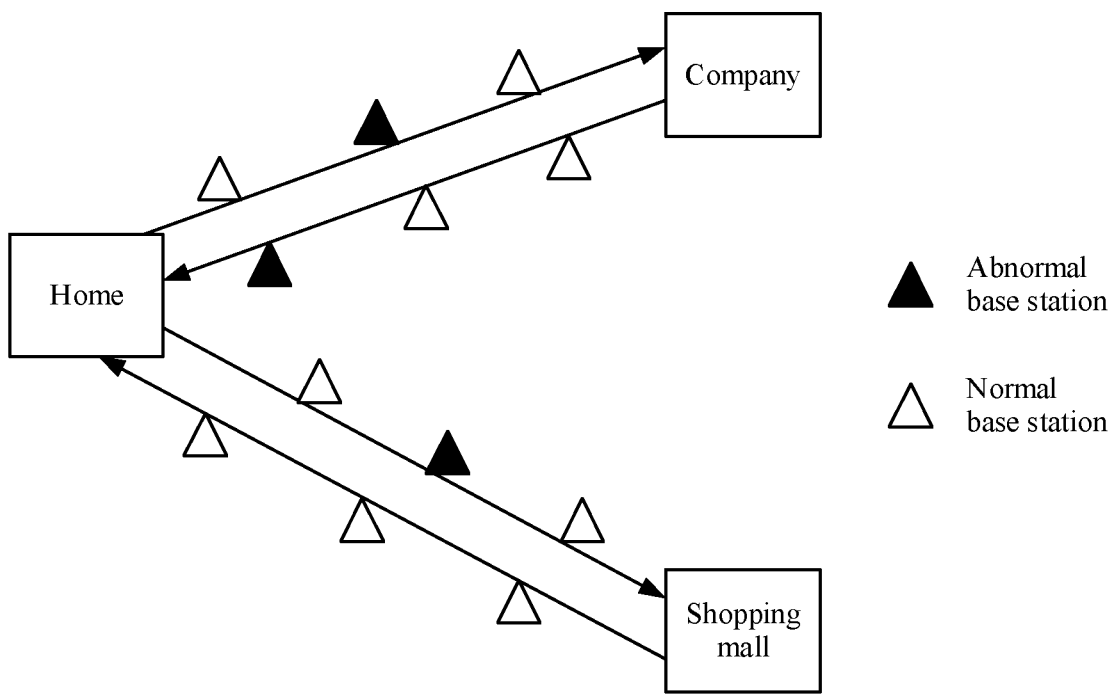
FIG. 6 is a schematic diagram of an example of a route according to an embodiment of this application.
Figure 7A:
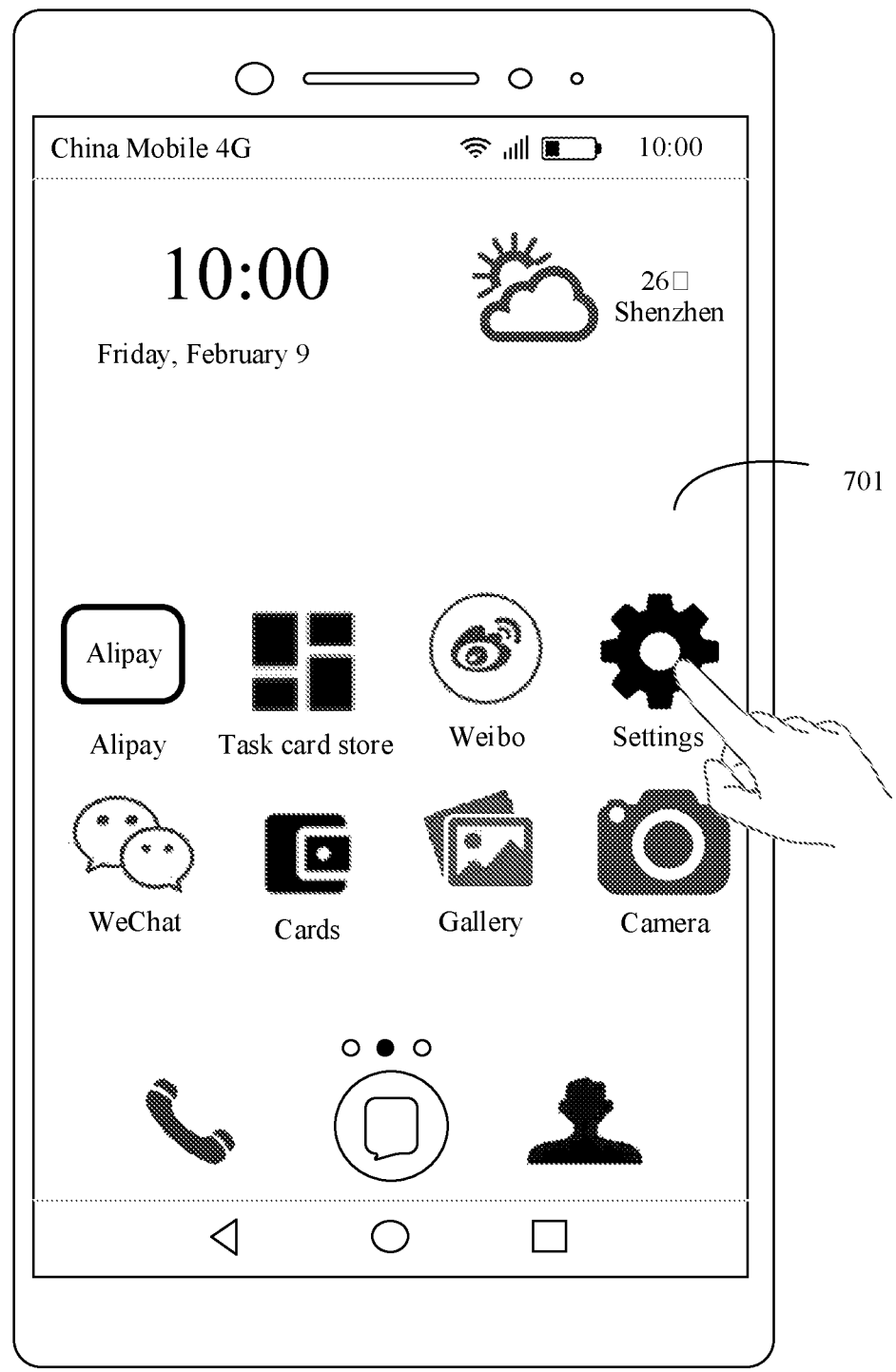
FIG. 7(a) to FIG. 7(d) are a schematic diagram of an example of enabling a specific route identification method according to an embodiment of this application.
Figure 7B:
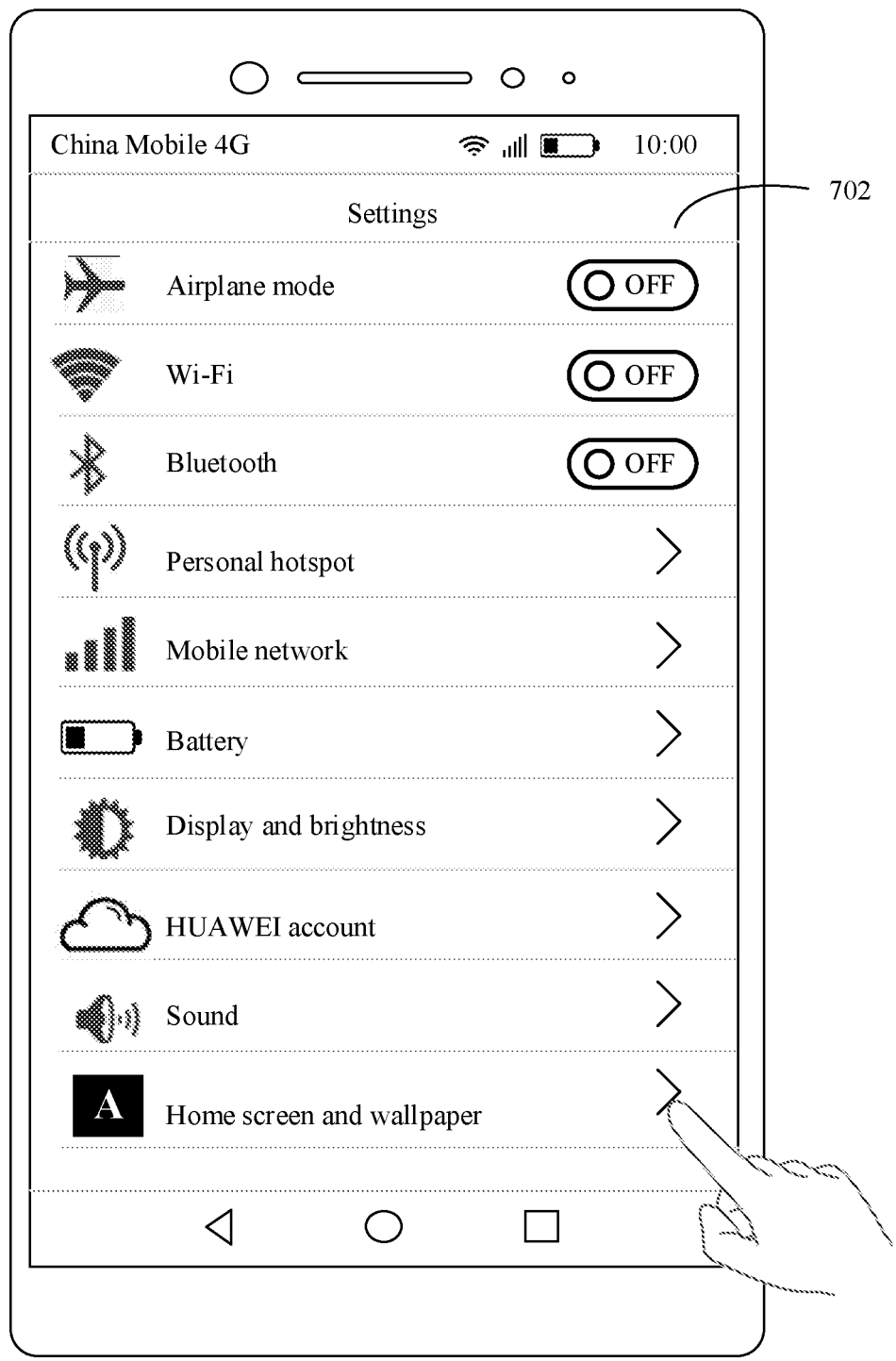
Figure 7C:
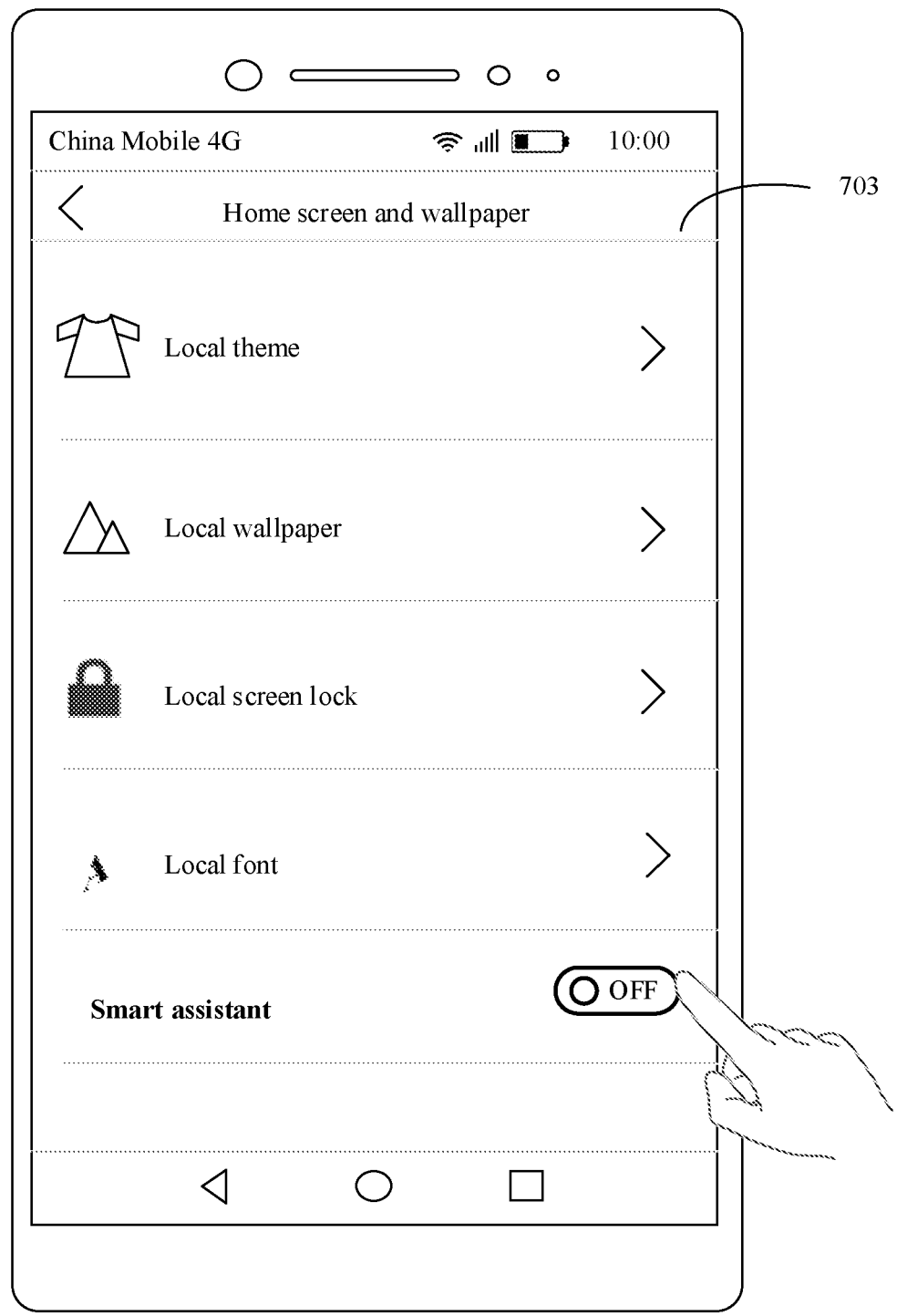
Figure 7D:
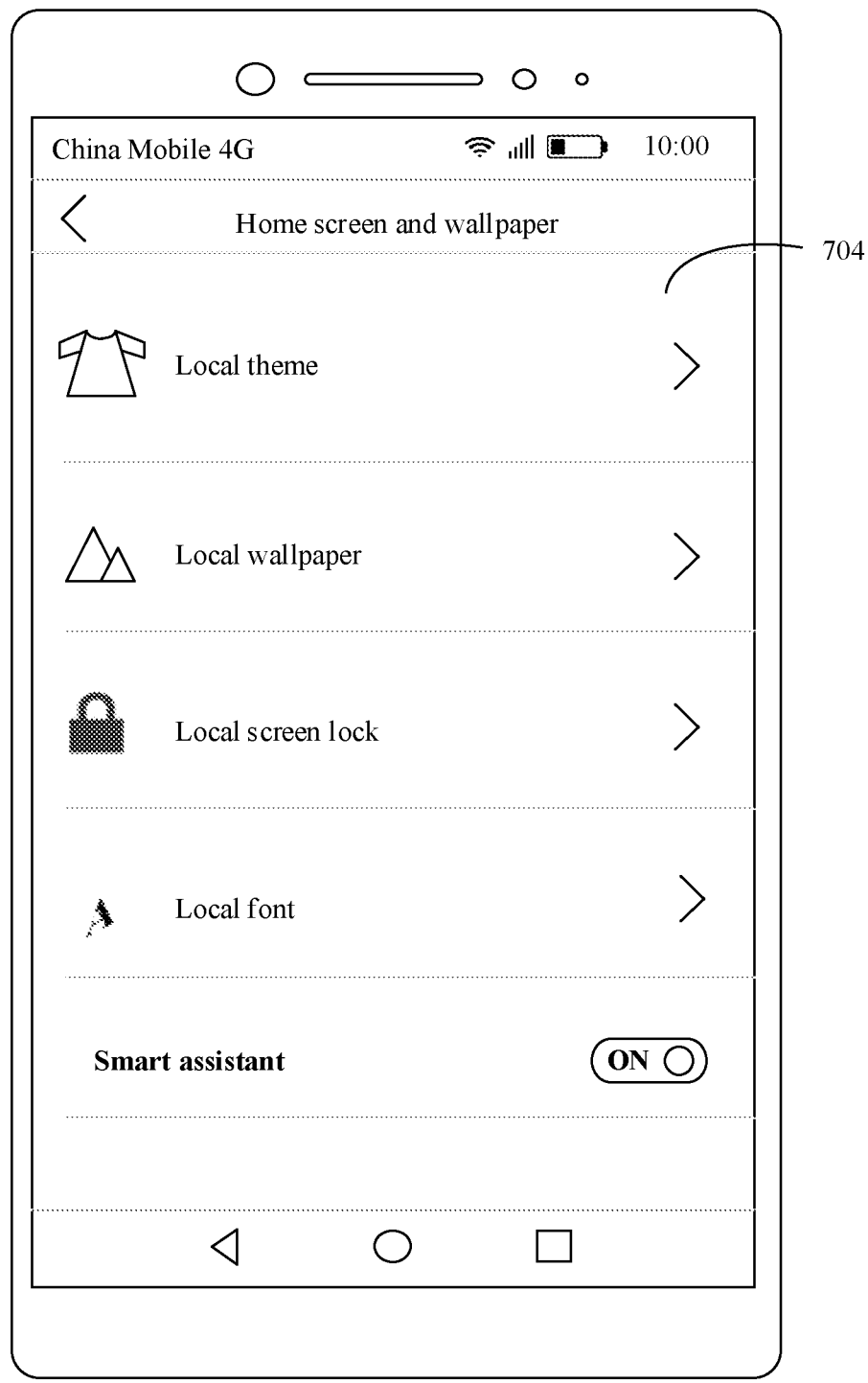

FIG. 6 is a schematic diagram of an example of a route according to an embodiment of this application. As shown in FIG. 6, for example, there may be a plurality of routes or different round-trip routes between a home, a company, and a most frequently visited shopping mall by a user. For the plurality of different routes, base stations on each route are different, and distribution of abnormal base stations and normal base stations is also different. According to the foregoing method for identifying a route based on timestamp information, the electronic device can identify only a base station near a home and a base station near a company, and cannot accurately identify a route to work from the home to the company or a route from work from the company to the home. This method can only roughly estimate, according to time information, whether the user is on a way to work or on a way from work, but cannot accurately determine a route of the user and estimate whether a base station with poor communication quality exists on the route. This method has problems of poor robustness and sensitivity, such as a limitation on types of routes to be identified and inability to identify a turn-back route.

In addition, another specific route identification method mainly uses global positioning system (global positioning system, GPS) or wireless network (wireless fidelity, Wi-Fi) positioning. Specifically, in a GPS positioning manner, a current location may be calculated by using a satellite with a known location and using a GPS receiver of the electronic device. In a Wi-Fi network positioning manner, location information of an electronic device is calculated by mainly using Wi-Fi physical address information and using a triangular positioning method or a fingerprint positioning method. In an actual application process, problems such as inaccurate positioning and delayed update may be caused due to poor GPS satellite searching and Wi-Fi network signal quality. In addition, using the GPS or Wi-Fi positioning may cause a high power consumption problem of the electronic device.

Therefore, this application provides a method for identifying a specific location on a specific route, to be capable of implementing classification and identification on the specific route, implementing route identification with high accuracy in real time, and meeting a requirement for low power consumption at the same time. It should be understood that the specific location on the specific route described in this application may be locations of a plurality of base stations included on the specific route.

In a possible implementation, the specific route identification method provided in this application may be enabled by setting an application.

FIG. 7(*a*) to FIG. 7(*d*) are a schematic diagram of an example of enabling a specific route identification method according to an embodiment of this application. As an example instead of a limitation, as shown in FIG. 7(*a*), a screen display system of a mobile phone displays current possible interface content, and the interface content is content of a home screen 701 of the mobile phone. The home screen 701 may display a plurality of third-party applications (application, App) such as Alipay, a task card store, Weibo, settings, WeChat, cards, gallery, and camera. It should be understood that, the interface content 701 may further include more applications. This is not limited in this application.

A user performs a tap operation on the settings application shown in FIG. 7(*a*). In response to the tap operation, the mobile phone enters a main interface 702 of the settings application, where the main interface 702 of the settings application may display content shown in FIG. 7(*a*). The interface 702 may specifically include an airplane mode setting control, a Wi-Fi setting control, a Bluetooth control, a personal hotspot control, a mobile network control, a battery control, a display and brightness setting control, a Huawei account control, a sound setting control, a privacy control, and the like. It should be understood that, the main interface 702 of the setting application may further include more or less display content. This is not limited in this application.

The user performs a tapping operation on a home screen and wallpaper control shown in FIG. 7(*b*). In response to the tapping operation, the mobile phone enters a home screen and wallpaper setting interface 703. The home screen and wallpaper setting interface 703 includes a local theme setting control, a local wallpaper setting control, a local lock screen setting control, a local font setting control, and a smart assistant control.

The user performs a turn-on operation on the smart assistant control shown in FIG. 7(*c*). In response to the turn-on operation, the mobile phone turns on the smart assistant. As shown in FIG. 7(*d*), the smart assistant has been turned on. Optionally, on the mobile phone, a specific route identification function provided in this embodiment of this application is turned on.

It should be understood that, after the smart assistant is turned on, more other functions may be further included, or the specific route identification function may be further turned on by using another possible shortcut, for example, may be turned on by using a settings option of an application run on an electronic device. Specifically, when the electronic device runs a video playing application, the specific route identification function may be turned on by using a settings option of the video playing application. This is not limited in this application.

In a possible implementation, the specific route identification method provided in this application may be in a turn-on state by default. To be specific, when detecting that a current route of a user may be a specific route of a plurality of specific routes recorded by the electronic device and an abnormal base station exists on the specific route, an application currently run on the electronic device is detected. When an audio application is run, a server is requested to cache in advance. Alternatively, when an application such as a game is run by the user, the user is reminded of, in a message notification manner, a time point at which the electronic device accesses the abnormal base station, so that the user makes another preparation, to prevent negative impact caused by a network disconnection of the abnormal base station. When detecting that the current route of the user is not any route of the plurality of specific routes recorded by the electronic device, the electronic device does not perform a subsequent operation such as cache request or generation of a reminding message about the time point at which the electronic device accesses the abnormal base station.

The following describes, with reference to the accompanying drawings, a route identification method provided in this application. The method may include two phases: a learning phase and a prediction phase. In the learning phase, mainly based on route information collected by an electronic device, related matching feature calculation is performed, a matching feature matrix of a learning database is construct, an initial autonomous clustering point is searched for, and information about a plurality of specific route is classified by using a k-nearest neighbor (k-nearest neighbor, KNN) algorithm. In the prediction phase, mainly based on a data record obtained through clustering, a downsampling operation is performed, the data record matches a base station sequence that is read in real time, and a route with a highest degree of matching in a classification set is used as a prediction output, to implement route identification. After a predicted specific route is output, the electronic device may obtain a communication status of a base station on the specific route, and predict a time point at which a user arrives at a base station with relatively poor network quality. Subsequently, the electronic device determines, based on a currently running application, whether a request needs to be sent to a server in advance, to request more data caches. To better understand the specific route identification method provided in this application, the following describes a specific implementation process and an algorithm principle.

Phase 1: Learning Phase

In the learning phase, an electronic device may collect information about a plurality of specific routes, for example, record information about all base stations on a plurality of routes, or record locations of a plurality of points. The electronic device performs sliding correlation coefficient calculation on each specific route to obtain a feature matrix, and classifies each specific route based on the feature matrix, to obtain the plurality of specific routes through classification.

It should be understood that, a method procedure in the learning phase may be performed offline or online. In addition, the electronic device may periodically perform route learning. For example, for a route from a home to a company of a user, the electronic device performs learning once every 10 days, and updates information of a route database, to improve accuracy of route recognition. This is not limited in this application.

In the following, the learning phase is specifically divided into three steps for description.

Step 1: Feature Identification and Feature Matrix Construction

Feature extraction is to find most effective features from original features, and obtain a group of features with obvious physical or statistical significance through feature conversion. In a process of the feature extraction, raw data needs to be obtained first, and then the raw data is converted into training data for a model. For example, in this embodiment of this application, a process of performing feature extraction on a specific route is a process in which information about a plurality of base stations included in the specific route is obtained and the obtained information about the base stations is converted in a feature matrix. The feature matrix construction is a process in which a mapping matrix is constructed by using feature vectors corresponding to first N largest feature values of a raw data covariance matrix, and then correlation processing or the like is performed on the feature matrix. The process of the feature identification and the feature matrix construction may specifically include two parts: route cell matching feature calculation and route matching feature matrix construction.

Figure 8:
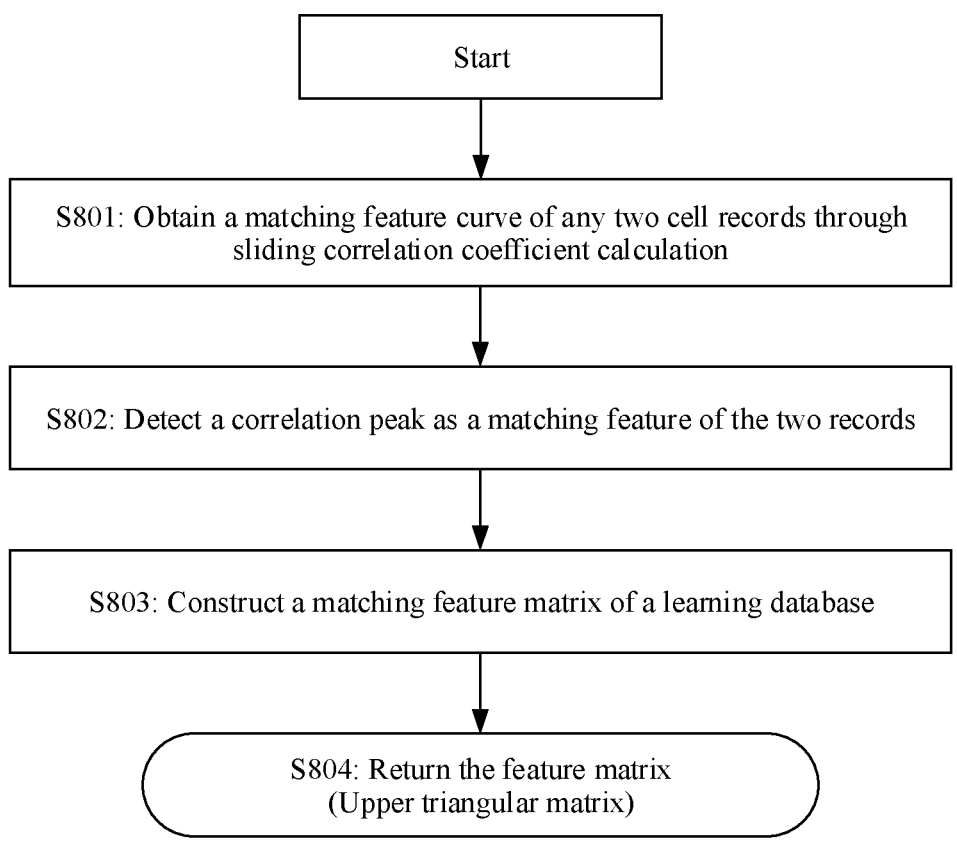
FIG. 8 is a schematic flowchart of an example of an algorithm according to an embodiment of this application.

FIG. 8 is a schematic flowchart of an example of an algorithm according to an embodiment of this application. As shown in FIG. 8, a specific processing procedure includes the following steps: S801: Obtain a matching feature curve of any two base station records through sliding correlation coefficient calculation. S802: Detect a correlation peak as a matching feature of the two records. S803: Construct a matching feature matrix of a learning database. S804. Return the feature matrix. S801 and S802 are a route cell matching feature calculation process. S803 is a route matching feature matrix construction process.

Figure 9:
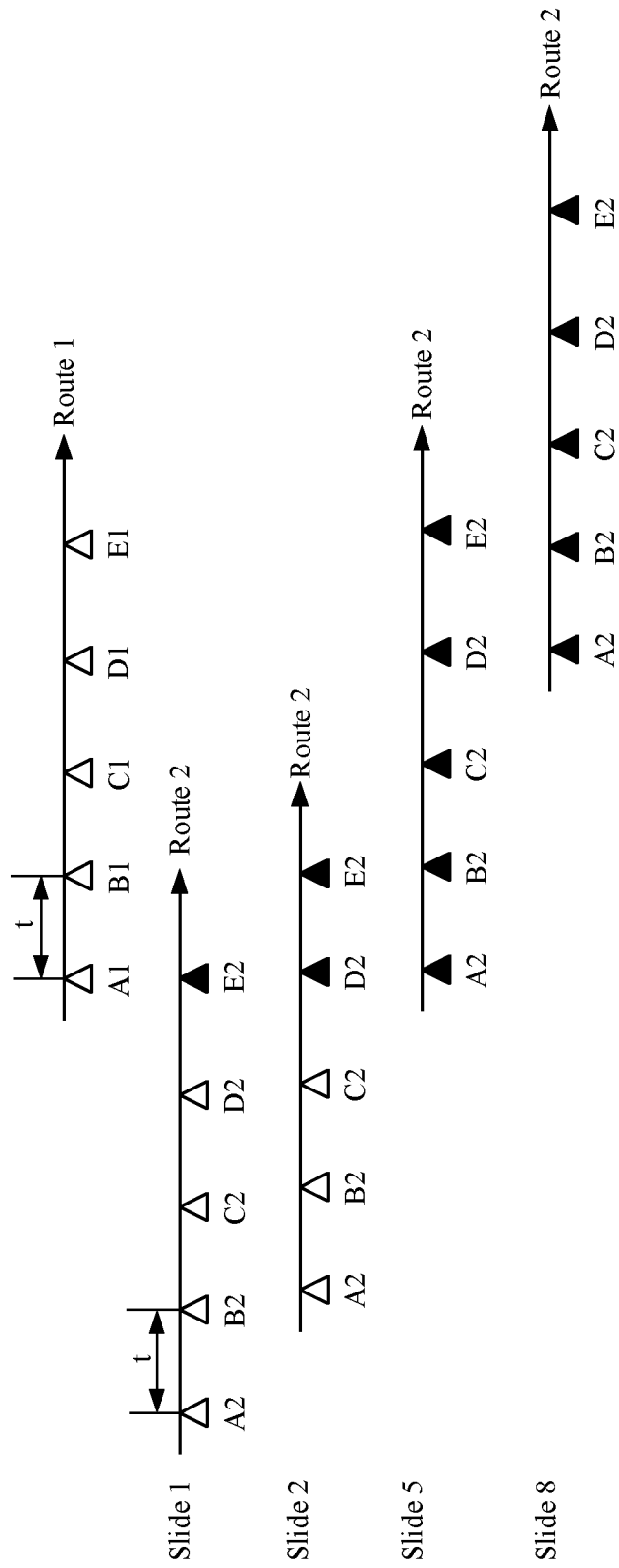
FIG. 9 is a schematic diagram of an example of a sliding correlation coefficient calculation process according to an embodiment of this application.

Specifically, FIG. 9 is a schematic diagram of an example of a sliding correlation coefficient calculation process according to an embodiment of this application. In S801, the matching feature curve of any two base station records is obtained through sliding. As shown in a schematic diagram of FIG. 9, two routes are denoted as a route 1 and a route 2 respectively. Five base stations A1 to E1 exist on the route 1, and five base stations A2 to E2 exist on the route 2. In a sliding process, information about each base station on the route 1 is used to match information about each base station on the route 2. As shown in the figure, sliding 1 indicates that sliding is performed once on the route 2 and the route 1, and a degree at which a base station A1 on the route 1 matches a base station E2 on the route 2 is calculated. Similarly, sliding 2 indicates that sliding is performed twice on the route 2 and the route 1, and a degree at which the base station A1 on the route 1 matches a base station D2 on the route 2 and a degree at which a base station B1 on the route 1 matches the base station E2 on the route 2 are calculated. Sliding 5 indicates that sliding is performed five times on the route 2 and the route 1, and a degree at which the base station A1 on the route 1 matches a base station A2 on the route 2, a degree at which the base station B1 on the route 1 matches a base station B2 on the route 2, a degree at which a base station C1 on the route 1 matches a base station C2 on the route 2, a degree at which a base station D1 on the route 1 matches the base station D2 on the route 2, and a degree at which a base station E1 on the route 1 matches the base station E2 on the route 2 are calculated. Sliding 8 indicates that sliding is performed eight times on the route 2 and the route 1, and a degree at which the base station D1 on the route 1 matches the base station A2 on the route 2 and a degree at which between the base station E1 on the route 1 matches the base station B2 on the route 2 are calculated. It should be understood that a quantity of sliding times may be obtained by subtracting 1 from a sum of quantities of base stations on two specific routes. For example, in FIG. 9, a quantity of sliding times for the route 1 and the route 2 is: 5+5−1=9.

In the sliding correlation coefficient calculation process, a feature of a base station on the route 1 is used to match a feature of a base station on the route 2. If a degree at which a feature of a base station on the route 1 matches a feature of a base station on the route 2 is greater than or equal to a first threshold TH, it is determined that the base station on the route 1 and the base station on the route 2 are a same base station, and the degree is denoted as 1. If a degree at which a feature of the A1 matches a feature of the A2 is lower than the first threshold TH, it is determined that the A1 and the A2 are not the same base station, and the degree is denoted as 0. By analogy, a degree at which each base station on the route 1 matches each base station on the route 2 is calculated through sliding.

Figure 10:
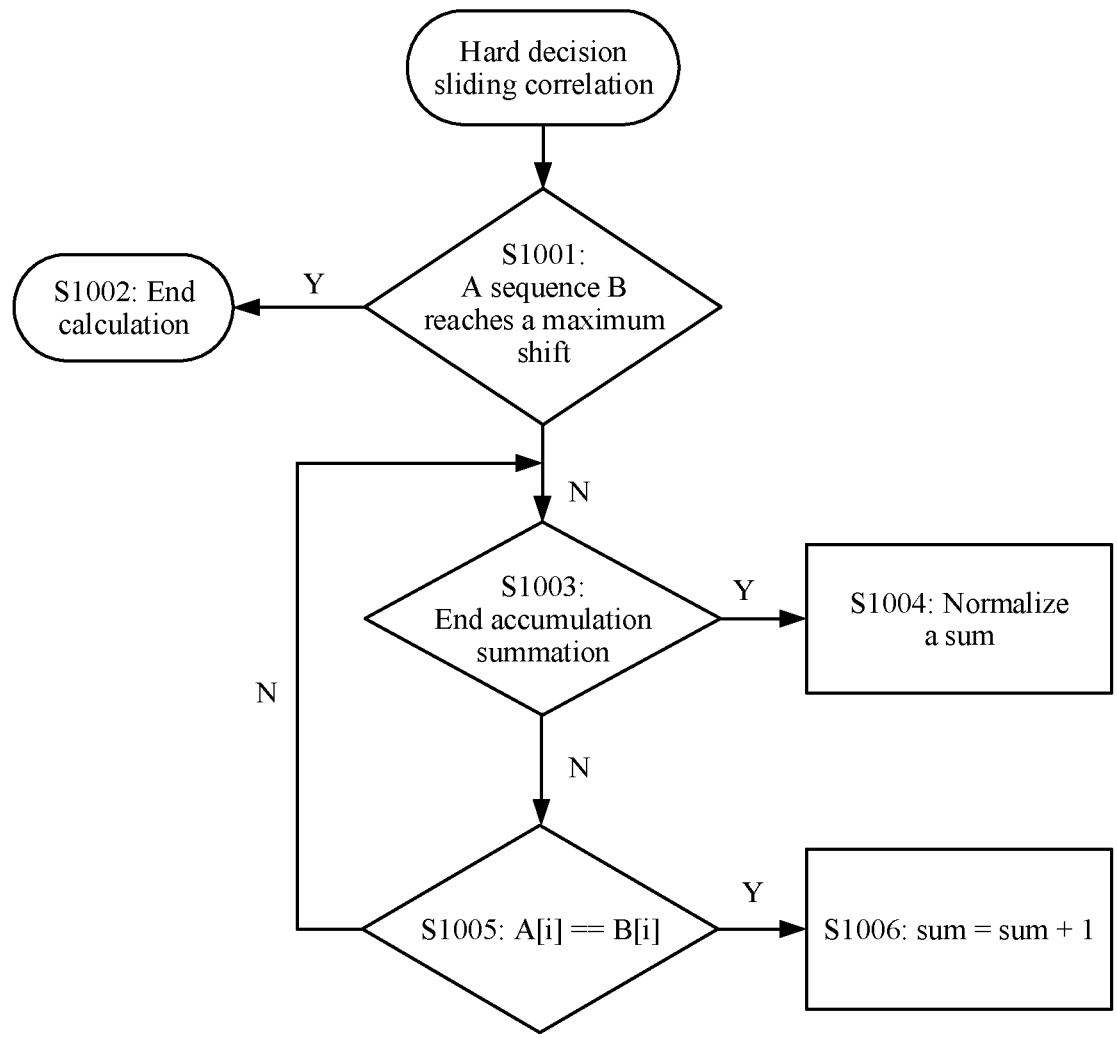
FIG. 10 is a flowchart of an example of a sliding calculation process according to an embodiment of this application.

FIG. 10 is a flowchart of an example of a sliding calculation process according to an embodiment of this application. In the process shown in FIG. 10, sliding correlation coefficient calculation may be performed in a hard decision-based correlation calculation manner. A hard decision rule is as follows: If two base station identifications (identification, ID) or cell identifications (cell identification, CID) of base stations are the same, statistical information is accumulated by 1; otherwise, no accumulation is performed. The process may include the following steps: S1001: Determine whether a sequence B reaches a maximum shift. S1002: When the sequence B reaches the maximum shift, end calculation. S1003: When the sequence B does not reach the maximum shift, determine whether accumulation summation ends. S1004: When the accumulation summation ends, normalize a sum (sum). S1005: When the accumulation summation does not end, determine whether A[i]==B[i]. S1006: When A[i]==B[i], accumulate the statistical information by 1, which is indicated as sum=sum+1; otherwise, cyclically continue to determine whether the accumulation summation ends.

Specifically, in a process of obtaining a matching feature curve of any two cell records through the sliding correlation coefficient calculation, route sequences of any two collected records are first obtained, which are respectively a sequence A corresponding to a route 1 and a sequence B corresponding to a route 2. When a CID in the sequence A is the same as a CID in the sequence B, the sum is accumulated by 1; otherwise, the sum is constant. Then, a correlation coefficient may be obtained by dividing the sum by a quantity of comparison times for normalization. Subsequently, the sequence B is shifted, and the correlation coefficient is calculated again. This calculation process is performed until the shift of the sequence B reaches a maximum value. When a quantity of sliding times reaches a maximum quantity of times, that is, a sequence reaches a maximum shift value, in the process of calculating the sliding correlation coefficients of the route 1 and the route 2 shown in FIG. 8, when sliding is performed to enable the base station E1 on the route 1 to match the base station A2 on the route 2, that is, the quantity of sliding times reaches the maximum quantity of times 9, the shift of the sequence B reaches the maximum value. In this way, a corresponding correlation coefficient curve, that is, a feature curve, may be obtained with a change of the shift value of the sequence B, and a maximum value of the feature curve is used as a correlation feature of the two records.

It should be understood that, each shift corresponds to one sum value. When A[i]==B[i], the statistical information is accumulated by 1. Alternatively, when A[i] and B[i] do not match, the statistical information is not accumulated until a maximum shift is reached. After determining a degree at which each base station on the route 2 matches any base station on the route 1 is completed, a summation sequence is obtained, as shown in the following Table 1. The sequence is normalized to obtain a corresponding correlation coefficient, that is, a correlation coefficient between each base station on the route 1 and each base station on the route 2 is obtained.

TABLE 1

| 0 | 1 | 1 | 1 | 1 | 1 | 1 | 1 | 1 | 1 | 1 | 1 | 1 |
|---|---|---|---|---|---|---|---|---|---|---|---|---|
| 1 | 0 | 1 | 1 | 1 | 1 | 1 | 1 | 1 | 1 | 1 | 1 | 1 |
| 1 | 1 | 0 | 1 | 1 | 1 | 1 | 1 | 1 | 1 | 1 | 1 | 1 |
| 1 | 1 | 1 | 0 | 1 | 1 | 1 | 1 | 1 | 1 | 1 | 1 | 1 |
| 1 | 1 | 1 | 1 | 0 | 1 | 1 | 1 | 1 | 1 | 1 | 1 | 1 |
| 1 | 1 | 1 | 1 | 1 | 0 | 1 | 1 | 1 | 1 | 1 | 1 | 1 |
| 1 | 1 | 1 | 1 | 1 | 1 | 0 | 1 | 1 | 1 | 1 | 1 | 1 |
| 1 | 1 | 1 | 1 | 1 | 1 | 1 | 0 | 1 | 1 | 1 | 1 | 1 |
| 1 | 1 | 1 | 1 | 1 | 1 | 1 | 1 | 0 | 1 | 1 | 1 | 1 |
| 1 | 1 | 1 | 1 | 1 | 1 | 1 | 1 | 1 | 0 | 1 | 1 | 1 |
| 1 | 1 | 1 | 1 | 1 | 1 | 1 | 1 | 1 | 1 | 0 | 1 | 1 |
| 1 | 1 | 1 | 1 | 1 | 1 | 1 | 1 | 1 | 1 | 1 | 0 | 1 |
| 1 | 1 | 1 | 1 | 1 | 1 | 1 | 1 | 1 | 1 | 1 | 1 | 0 |

Figure 11:
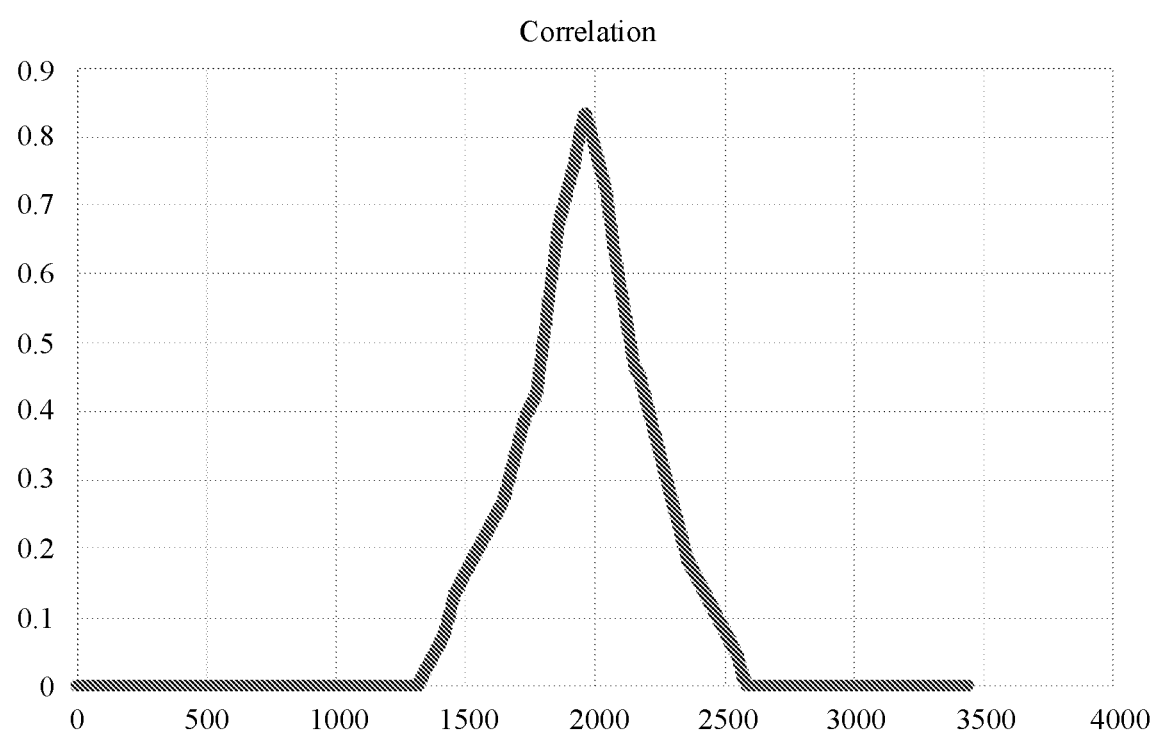
FIG. 11 is a schematic diagram of an example of a feature curve according to an embodiment of this application.

A process in which a correlation coefficient changes with a sampling point change is drawn as a curve, as shown in FIG. 11. FIG. 11 is a schematic diagram of an example of a feature curve according to an embodiment of this application. For the feature curve shown in FIG. 11, a horizontal coordinate indicates a sampling point offset value, and a vertical coordinate indicates a calculated correlation coefficient. After the correlation matching feature curve is obtained through calculation, and a correlation peak is detected as a matching feature of the two records, to construct a matching feature matrix of the learning database. This matrix is an upper triangular matrix as shown in Table 2 below.

TABLE 2

| 0 | 0.24042879 | 0.66492147 | 0.265664 | 0.832972 | 0.28111 | 0.843063 |
|---|---|---|---|---|---|---|
| 0 | 0 | 0.30474732 | 0.827903 | 0.271822 | 0.815577 | 0.271822 |
| 0 | 0 | 0 | 0.345029 | 0.806218 | 0.318711 | 0.830933 |
| 0 | 0 | 0 | 0 | 0.331662 | 0.774396 | 0.315789 |
| 0 | 0 | 0 | 0 | 0 | 0.318711 | 0.954511 |

TABLE 2-continued

| 0 | 0 | 0 | 0 | 0 | 0 | 0.318711 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0.281867 | 0.80316 | 0.304572 | 0.316213 | 0.253022 | 0.878719 | |
| 0.748654 | 0.271822 | 0.725881 | 0.78852 | 0.742143 | 0.267994 | |
| 0.356373 | 0.865043 | 0.304572 | 0.379658 | 0.332796 | 0.807018 | |
| 0.734291 | 0.368421 | 0.824561 | 0.725076 | 0.808688 | 0.292398 | |
| 0.356373 | 0.797542 | 0.304572 | 0.379658 | 0.319903 | 0.812357 | |
| 0.872531 | 0.318711 | 0.776186 | 0.896274 | 0.863026 | 0.313339 | |
| 0.339318 | 0.806672 | 0.313116 | 0.379658 | 0.304593 | 0.79405 | |
| 0 | 0.356373 | 0.876122 | 0.958711 | 0.929982 | 0.314183 | |
| 0 | 0 | 0.309735 | 0.379658 | 0.343272 | 0.816171 | |
| 0 | 0 | 0 | 0.872105 | 0.921031 | 0.315027 | |
| 0 | 0 | 0 | 0 | 0.94864 | 0.352467 | |
| 0 | 0 | 0 | 0 | 0 | 0.282031 | |
| 0 | 0 | 0 | 0 | 0 | 0 | |

It should be understood that each item in the upper triangular matrix is a correlation coefficient between two routes, and is used to indicate a degree at which the two routes match with each other.

It should be further understood that the constructed matching feature matrix is the upper triangular matrix, and a correlation coefficient between the base station A1 on the route 1 and the base station A2 on the route 2 corresponds to only one value. Therefore, each item that is in a lower triangular part of a matrix and that indicates the correlation coefficient between the base station A2 of the route 2 and the base station A1 of the route 1 is denoted as 0. In this upper triangular matrix, a calculation amount can be simplified, and detection efficiency is improved.

A feature matrix construction process is completed by using the foregoing steps.

Figure 12:
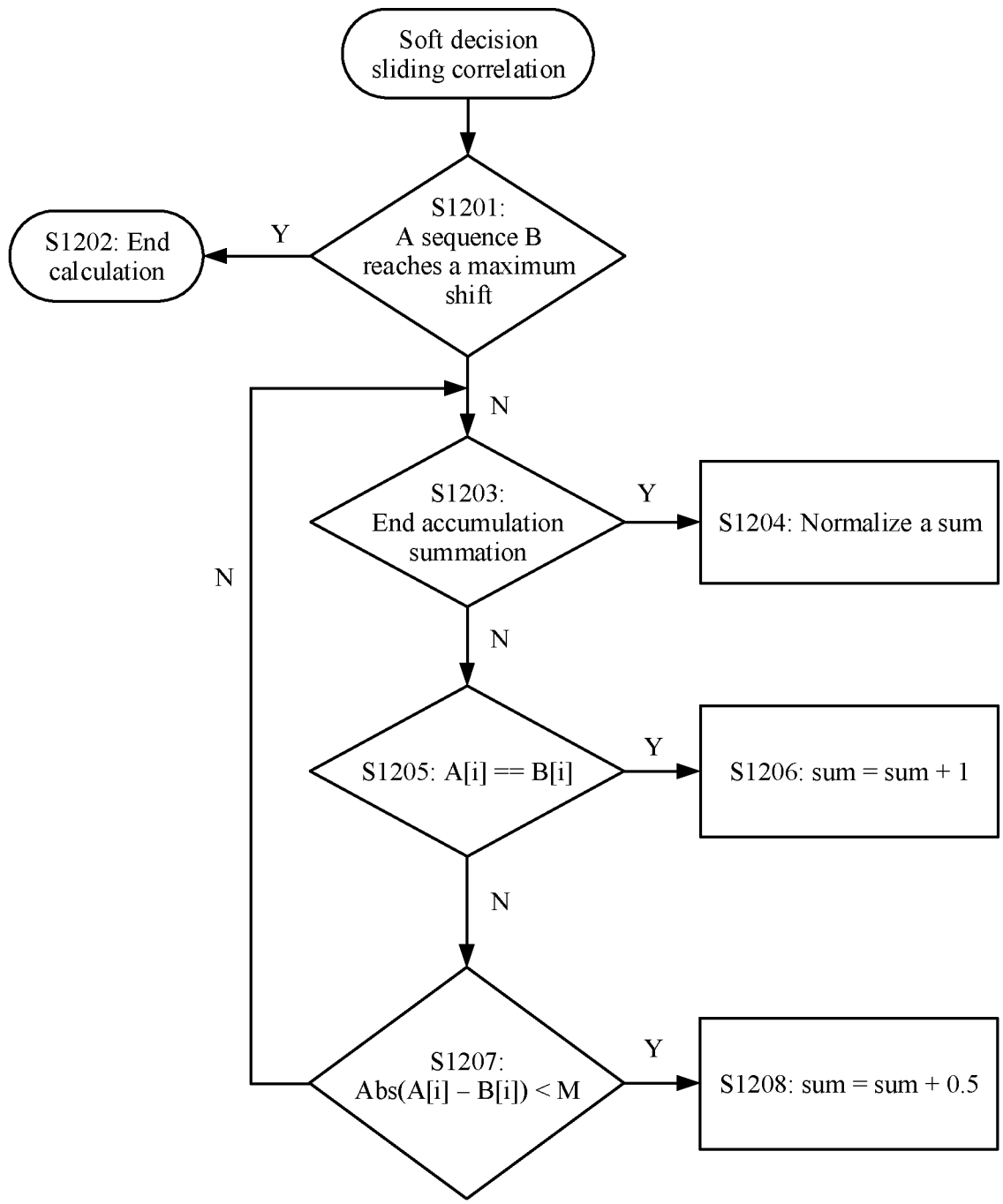
FIG. 12 is a flowchart of another example of a sliding calculation process according to an embodiment of this application.

In a possible implementation, when sliding matching is performed, a soft decision-based correlation calculation manner may be used. FIG. 12 is a flowchart of another example of a sliding calculation process according to an embodiment of this application. In the process shown in FIG. 12, sliding correlation coefficient calculation is performed in a soft decision-based correlation calculation manner. The soft decision considers that, when an operator performs networking, adjacent CIDs may be allocated to base stations whose locations are adjacent. Therefore, during correlation calculation, if CIDs are the same, statistical information is accumulated by 1; or if a difference between CIDs is within M, locations of the CIDs are considered to be adjacent, and statistical information is accumulated by 0.5; in other cases, the statistical information is not accumulated. M ranges from 1 to 20. The process may include the following steps: S1201: Determine whether a sequence B reaches a maximum shift. S1202: When the sequence B reaches the maximum shift, end calculation. S1203: When the sequence B does not reach the maximum shift, determine whether accumulation summation ends. S1204: When the accumulation summation ends, normalize a sum (sum). S1205: When the accumulation summation does not end, determine whether A[i]==B[i]. S1206: When A[i]==B[i], accumulate the statistical information by 1, which is indicated as sum=sum+1. S1207: When A[i] is not equal to B[i], continue to determine whether Abs(A[i]−B[i])<M. S1208: When Abs(A[i]−B[i])<M, accumulate the statistical information by 0.5, which is indicated as sum=sum+0.5; otherwise, cyclically continue to determine whether the accumulation summation ends.

Based on the foregoing hard decision sliding calculation, the soft decision method described above considers a factor of operator networking; in addition, when locations of cells are adjacent and CIDs are also adjacent, it can be ensured that a difference between the CIDs may cause a specific route identification error between the adjacent cells. This further improves robustness of route identification.

Step 2: Autonomous Clustering

In the learning phase, a route matching feature matrix may be constructed by using the method in step 1. For example, an initial autonomous clustering point is screened by processing the initial feature matrix in Table 2.

Figure 13:
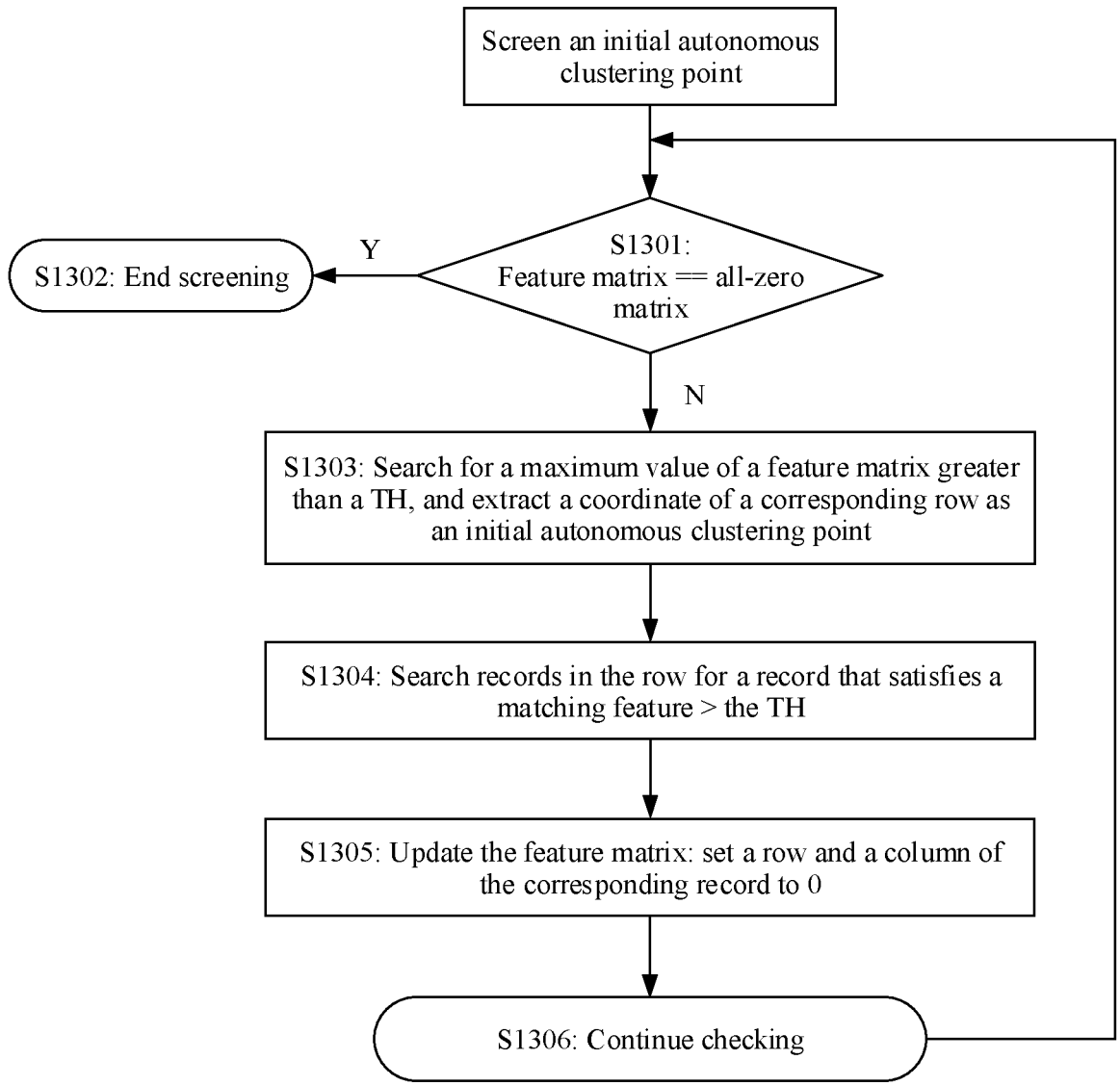
FIG. 13 is a flowchart of an example of an autonomous clustering process according to an embodiment of this application.

FIG. 13 is a flowchart of an example of an autonomous clustering process according to an embodiment of this application. The process shown in FIG. 13 includes the following steps: S1301: Determine whether a feature matrix is an all-zero matrix. S1302: When the feature matrix is the all-zero matrix, end a screening process. S1303: Search for a maximum value of a matching feature greater than a TH in an upper triangular feature matrix, and extract a corresponding row coordinate as an initial autonomous clustering point. S1304: Search for a record whose matching feature is greater than a TH1 and that is in the row, where a value of the TH may range from 0 to 0.55. S1305: Update the feature matrix, that is, set, to 0, a row and a column of the record that meets a requirement. S1306: Continue to search for and check until the feature matrix is the all-zero matrix.

Specifically, the TH1 may be valued as 0.5. In the upper triangular matrix shown in Table 2, a maximum value 0.958711 of a correlation coefficient is first searched for, and all items that are in a row corresponding to the maximum value 0.958711 and whose matching features are greater than 0.5 are returned to zero, for example, all correlation coefficients greater than 0.5 in the row in which the maximum value 0.958711 in Table 2 is located are returned to zero. Subsequently, a record in which a matching feature is greater than the TH with the row record is searched for again, and all corresponding rows and columns are returned to zero. A matrix shown in the following Table 3 is obtained through a first round of processing of the initial clustering search, and an output is indicated as InitialSet=[7] in an algorithm. By analogy, searching and checking are continued, and a second round of processing of the initial clustering search is performed until the feature matrix is the all-zero matrix shown in Table 4, where an output is indicated as InitialSet=[7, 4] in the algorithm.

TABLE 3

| 0 | 0 | 0.66492147 | 0 | 0.832972 | 0 | 0.843063 | 0 | 0.80316 | 0 | 0 | 0 | 0.878719 |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 0 | 0.806218 | 0 | 0.830933 | 0 | 0.865043 | 0 | 0 | 0 | 0.807018 |
| 0 | 0 | 0 | 0 | 0 | 0 | 0 | 0 | 0 | 0 | 0 | 0 | 0 |
| 0 | 0 | 0 | 0 | 0 | 0 | 0.954511 | 0 | 0.797542 | 0 | 0 | 0 | 0.812357 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0.806672 | 0 | 0 | 0 | 0.79405 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0.816171 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |

TABLE 4

| 0 | 0 | 0 | 0 | 0 | 0 | 0 | 0 | 0 | 0 | 0 | 0 | 0 |
|---|---|---|---|---|---|---|---|---|---|---|---|---|
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |

After the foregoing processing are performed, all specific routes are classified, to obtain two different types of routes. For example, in this embodiment of this application, two types that are a route 4 and a route 7 are classified, and the route 4 and the route 7 are two completely different types of routes. In other words, the route 4 and the route 7 are two types of routes that are most different from each other in all obtained specific routes.

Step 3: KNN Algorithm Clustering

It should be understood that, in an autonomous clustering process of an original feature matrix, it is determined that the route 4 and the route 7 are two totally different types of routes. In the obtained plurality of specific routes, there may be a type of specific route that is similar to both the specific route 4 and the specific route 7. In other words, according to the foregoing autonomous clustering process, the route may be classified into either the type of the specific route 4 or the type of the specific route 7. To accurately perform classification processing on this type of route, after the autonomous clustering in step 2 is performed, KNN algorithm clustering processing is performed on the original feature matrix.

Next, the remaining routes are classified based on a k-nearest neighbor algorithm (KNN algorithm). First, a route is selected from the remaining records. Based on the KNN method, K largest matching features with the route may be selected, and each matching feature is greater than a TH2. Then, a type to which most of the K features belong is used as a type of the route, where the TH2 ranges from 0 to 0.55. It should be understood that values of the TH2 and the TH1 may be the same or different. This is not limited in this application.

Figure 14:
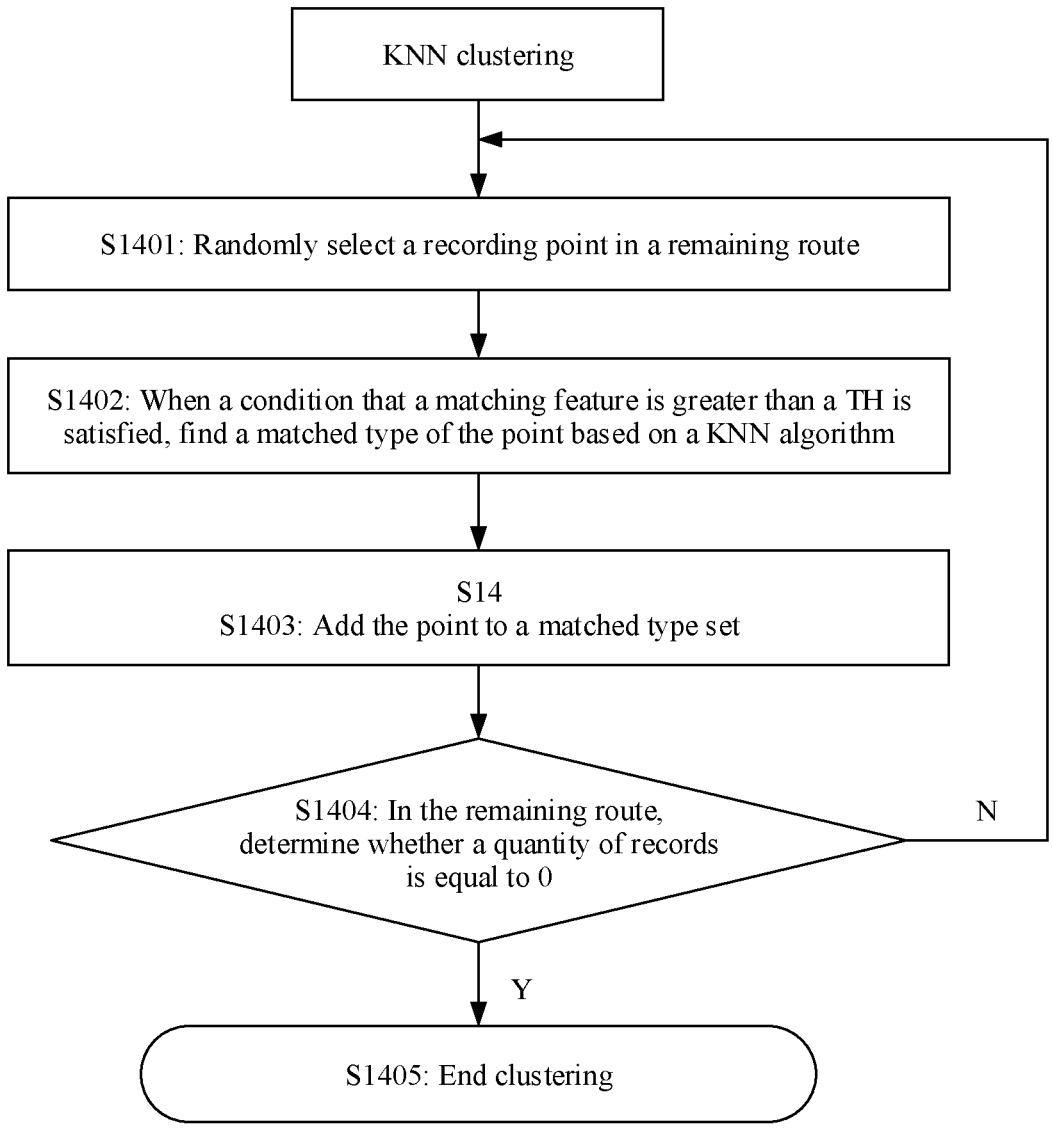
FIG. 14 is a flowchart of an example of a KNN clustering process according to an embodiment of this application.

FIG. 14 is a flowchart of an example of a KNN clustering process according to an embodiment of this application. The process shown in FIG. 14 includes the following steps:

S1401: Randomly select a recording point in a remaining route. S1402: When a condition that a matching feature is greater than the TH is satisfied, find a matched type of the point based on a KNN algorithm. S1403: Add the point to a matched type set. S1404. Determine whether a quantity of records in the remaining route is 0. S1406: When the quantity of records in the remaining route is 0, end clustering; otherwise, continue to cyclically read record points in the remaining route to determine and match types.

Specifically, for the initial autonomous clustering point InitialSet=[7, 4] obtained through the second round of the initial clustering search, a type of a nearest neighbor of this point is selected as a type of this point according to the KNN method (K=1 is selected), that is, a condition in that a maximum matching feature>0.5 is satisfied.

It should be understood that after the foregoing classification, clustering of a part of remaining routes is not completed, and the part of the remaining routes can be classified by using the foregoing procedure. K maximum correlation coefficients of the route are extracted from each remaining route, and it is ensured that the K correlation coefficients are all greater than the TH2. A type to which most of the K features belong is determined, and the type is used as a type of the route.

In conclusion, an electronic device completes a process of learning a specific route of a user. After completing processing in the learning phase, the electronic device obtains a plurality of specific routes from a home to a company, information about base stations on each specific route, and the like, which is a basis for the electronic device to perform route identification and matching. It should be understood that the learning of the specific route can be performed periodically, and the specific route of the user can be updated timely. This improves accuracy of route identification.

Phase 2: Prediction Phase

Through related processing in the learning phase, specific route classification has been completed. In the prediction phase, online identification on the route of the user may be implemented based on the classified specific routes.

Figure 15:
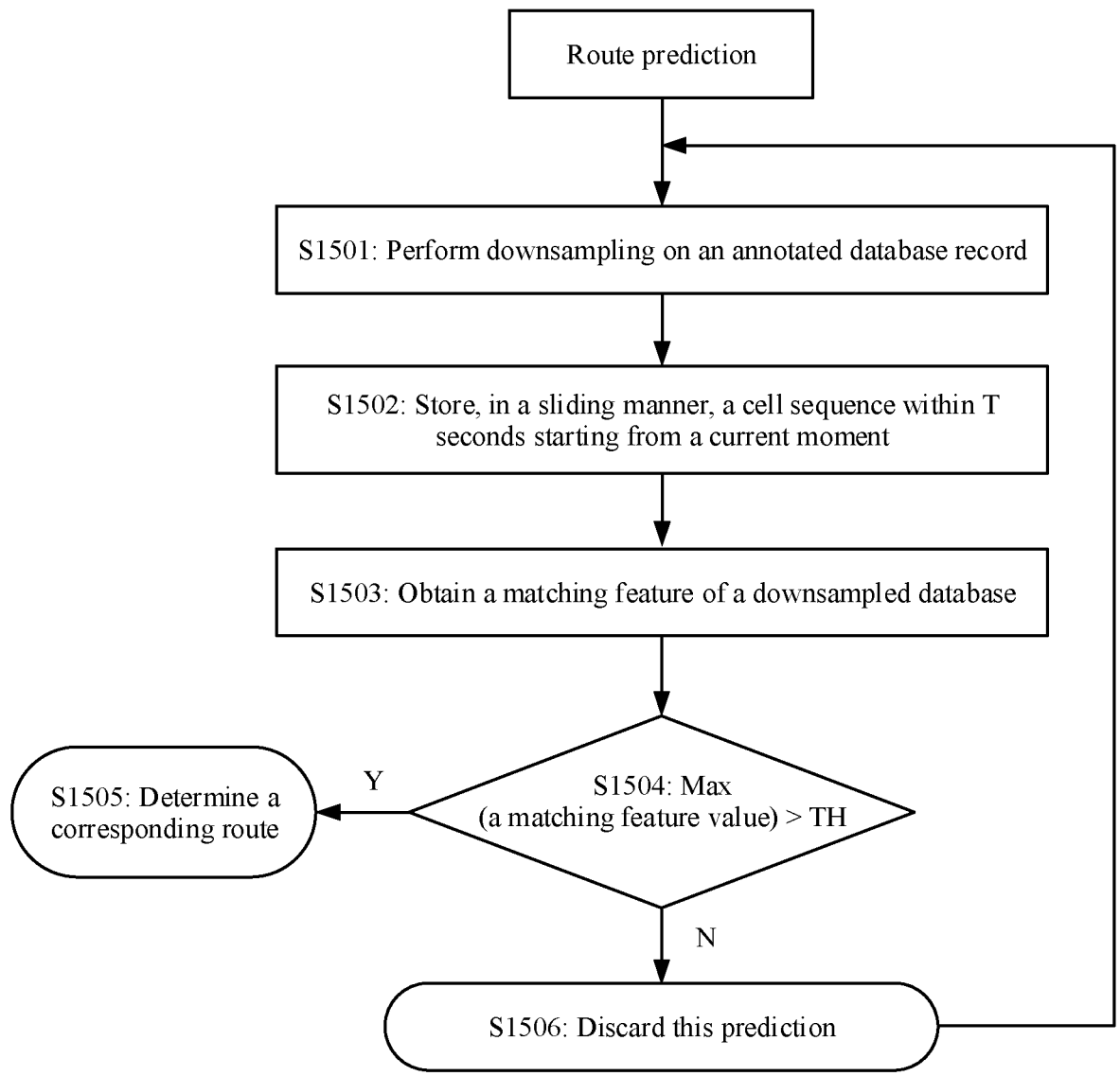
FIG. 15 is a schematic flowchart of an example of a specific route identification method according to an embodiment of this application.

FIG. 15 is a flowchart of an example of a route identification process according to an embodiment of this application. The process shown in FIG. 15 includes the following steps: S1501: Perform downsampling on an annotated database record. S1502: Store, in a sliding manner, a cell sequence within T seconds starting from a current time point. S1503: Obtain a matching feature of a downsampled database. S1504: Determine whether a maximum matching feature value Max is greater than a TH. S1505: When the maximum matching feature value Max is greater than or equal to a TH3, determine that the route is a corresponding route. S1506: When the maximum matching feature value Max is less than the TH3, discard this prediction, and continue to cyclically perform downsampling on the database.

Specifically, in the prediction phase, a route is first selected from a remaining record. To implement quick identification, the electronic device samples a classified route data set, to obtain information about a learned specific route. Optionally, in the sampling process, a sampling frequency may be appropriately reduced, for example, the information about the learned specific route is periodically obtained through downsampling. Subsequently, the electronic device stores a cell sequence within T seconds starting from a current time point, matches route information read in real time with the sampled information about the specific route, obtains a matching feature with a downsampling database, and selects a type with a maximum matching feature greater than the TH3 as a result of the online prediction. A downsampling period T is less than or equal to 120 s, and a value of the TH3 ranges from 0 to 0.55. Similarly, the value of the TH3 may be the same as or different from the value of the TH2 or the value of the TH1. This is not limited in this application.

It should be understood that downsampling is a manner in which the information about the learned specific route is periodically obtained. In addition, the downsampling can reduce an operation amount of the electronic device. For example, generally, sampling may be performed once every second, but the downsampling may be performed once every two seconds. On the premise that identification accuracy is not affected, a calculation amount of the electronic device can be reduced by reducing a sampling frequency, to reduce power consumption.

According to the foregoing solution, the electronic device may implement learning and identification on a specific route, CID matching of a base station in a sliding manner, and construction of feature information, to provide assurance for route optimization. In addition, this process does not need prior information of any route. The initial autonomous clustering points are divided based on the matching feature matrix search method, and a route classification effect can be achieved through autonomous clustering. Subsequently, a type to which a remaining route belongs is calculated by utilizing the KNN algorithm, and a quick route prediction effect is achieved through downsampling. In a sliding process, this application further provides a soft-decision sliding algorithm, which considers a networking feature of a live network, and implements correlation matching between route cell sequence features based on the soft-decision algorithm, to further improve robustness of route identification, and improve real-time performance and sensitivity of detection in a route prediction phase.

In conclusion, the specific route identification method provided in this application greatly reduces power consumption of the electronic device compared with existing GPS, Wi-Fi, and the like route identification methods, and improves robustness, and real-time performance and sensitivity of route detection compared with a method of route identification by using time dimension.

In addition, in the specific route identification process, different implementations may be included to apply the method to an electronic device.

In a possible implementation, an agreement is reached with a source application development end, and an interface is provided in a source application, where the interface may be used by a user to set whether a specific route identification function is turned on. When the user turns on the specific route identification function through the interface, in a subsequent specific route identification process, when the electronic device monitors an abnormal base station on a specific route that is determined to be output, the electronic device may determine, based on a type of an application, to cache before accessing the abnormal base station, or notify, in a message manner, the user of a time point at which the electronic device accesses the abnormal base station. When the specific route identification function is not turned on in an application, the electronic device does not perform the foregoing subsequent operation.

For example, a video playing application is used as an example. An on/off control is provided in a setting menu of the video playing application, and a function of the on/off control is similar to that of the smart assistant control shown in FIG. 7(a) to FIG. 7(d). When the on/off control is in an on state, the specific route identification function is turned on. In a subsequent specific route identification process, when detecting that there is an abnormal base station on a specific route, the electronic device may send a cache request to a server of the video playing application, to request to cache more video data.

In another possible implementation, an agreement with a source application development end is not required. This application provides a set of software development kit (software development kit, SDK), so that the electronic device has the specific route identification function before delivery. The software is run in a system library of a software architecture of the electronic device in FIG. 2, to provide the electronic device with a function of identifying a specific location on a specific route.

Specifically, video playing is used as an example. The electronic device may directly form a function proxy inside the electronic device without depending on a video development end, so that receiving and sending of a video data packet can be controlled without being perceived by a user. For example, the electronic device communicates with a server to request to cache the video data packet in advance. When the electronic device is to access an abnormal base station on a currently identified specific route, an obtained video data packet is sent to the video application in advance. Alternatively, when no abnormal base station exists on a currently identified specific route, a request is sent according to a rate at which the electronic device normally obtains the video data packet, and the video data packet is received.

Figure 16:
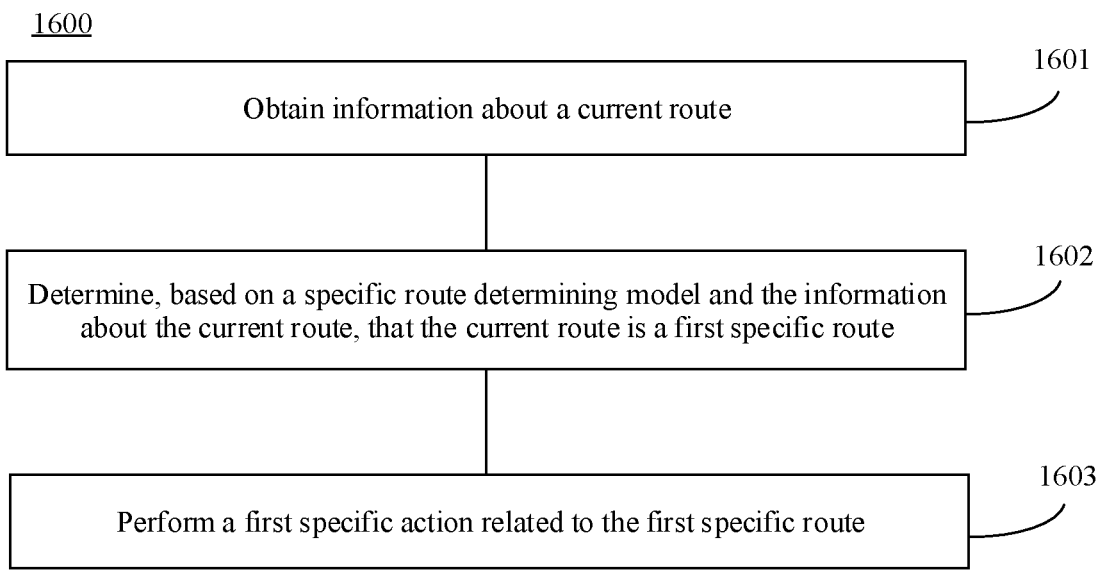
FIG. 16 is a schematic flowchart of a specific route identification method according to an embodiment of this application.

With reference to the foregoing embodiments and related accompanying drawings, an embodiment of this application provides a specific route identification method. The method may be implemented in the electronic device (for example, a mobile phone or a tablet computer) shown in FIG. 1 and FIG. 2. FIG. 16 is a schematic flowchart of a specific route identification method according to an embodiment of this application. As shown in FIG. 16, the method may include the following steps:

1601: An electronic device obtains information about a current route.

The information about the current route includes information about a first wireless network set, the first wireless network set includes a first wireless network and a second wireless network, communication quality of the first wireless network is greater than a first threshold, and communication quality of the second wireless network is less than or equal to the first threshold; and the information about the current route includes information about the first wireless network and information about the second wireless network.

It should be understood that in this application, information about a route is information about a wireless network on the route, for example, information about a base station. In this application, a base station is used as an example to specifically describe a terminal performance optimization method. In this application, the first wireless network corresponds to a normal base station, and the normal base station may be a base station that provides a normal network service for the terminal device. The second wireless network corresponds to an abnormal base station. The abnormal base station may be a base station that cannot provide a network service for the terminal device. The terminal device is disconnected from a network in a coverage area of the abnormal base station, or a download rate is lower than a specific threshold, and/or a service slowly responds.

It should be further understood that the electronic device obtains the information about the current route is to obtain information about all base stations on the current route or record location information of a plurality of base stations. Optionally, information about a base station includes base station identification information or cell identification information. This is not limited in this application.

It should be further understood that the first wireless network set may include at least one base station, and the at least one base station may correspond to the normal base station and the abnormal base station in the descriptions of the embodiment. A quantity of normal base stations and a quantity of abnormal base stations included in the first wireless network set are not limited in this application.

In a process in which a moving route of a user changes, the electronic device collects information about base stations along the current route in real time.

1602: The electronic device determines, based on the specific route determining model and the information about the current route, that the current route is a first specific route.

Optionally, before step 1602, the electronic device may first determine the specific route determining model. The specific route determining model includes information about a plurality of specific routes, and each of the plurality of specific routes includes a second wireless network set.

In a possible implementation, the electronic device may obtain the information about the plurality of specific routes, construct a first feature matrix of the plurality of specific routes based on the obtained information about the plurality of specific routes, and then perform classification processing on the plurality of specific routes based on the first feature matrix, to obtain a second feature matrix, and determining the specific route determining model based on the second feature matrix.

In a possible implementation, the electronic device obtains a matching feature curve of any two specific routes of the plurality of specific routes through sliding correlation coefficient calculation, and constructs the first feature matrix based on the matching feature curve. The sliding correlation coefficient calculation includes a hard-decision calculation or a soft-decision calculation.

It should be understood that, in an autonomous clustering process of an original feature matrix, there may be two specific routes whose similarities are close to each other. In other words, according to the foregoing autonomous clustering process, the two specific routes may be classified into either of the two specific routes. To classify the routes accurately, KNN algorithm clustering processing is performed on the original feature matrix.

Specifically, any one of the plurality of specific routes may be classified based on a k-nearest neighbor algorithm and the first feature matrix. For a process, refer to FIG. 14 and related descriptions. Details are not described herein again.

For example, the foregoing process corresponds to a learning phase of a specific route identification process. For a detailed process of the learning phase, refer to related descriptions of FIG. 8 to FIG. 14. Details are not described herein again.

In a possible implementation, the electronic device may obtain information about a base station in the second wireless network set included in each specific route in the specific route determining model, and determine that the current route is the first specific route when determining that a degree at which the information about the base station in the second wireless network set matches information about a base station in the first wireless network set is greater than or equal to a second threshold.

It should be understood that the first threshold and the second threshold may be configured in advance. Sizes and configuration manners of the first threshold and the second threshold are not limited in this application.

In a possible implementation, the electronic device may periodically obtain the information about the base station in the second wireless network set included in the specific route determining model.

For example, downsampling is a manner in which information about a learned specific route is periodically obtained. In addition, the downsampling can reduce an operation amount of the electronic device. For example, generally, sampling may be performed once every second, but the downsampling may be performed once every two seconds. On the premise that identification accuracy is not affected, a calculation amount of the electronic device can be reduced by reducing a sampling frequency, to reduce power consumption.

1603: Perform a first specific action related to the first specific route. The first specific action includes at least one of the following: changing a network search interval; or searching for different network signals based on a network standard change; or generating a first message when determining that an application currently run on the terminal device is a first application. The first message is used to indicate the terminal device to send a cache request to a server corresponding to the first application, and/or the first message is used to indicate a time point at which the terminal device accesses the second wireless network.

In a possible implementation, when the first application is a game application, the electronic device displays the first message on a first interface. The first interface is a running interface of the game application, and the first message is used to indicate a time point at which the electronic device accesses an abnormal base station.

For example, the first message is a pop-up reminder shown in FIG. 4(*a*) or FIG. 4(*b*).

In a possible implementation, when the first application is an audio application or a video application, the electronic device sends, based on the first message, a cache request to a server corresponding to the audio application or the video application, where the cache request is used to cache audio data or video data from the server.

For example, for the video playing application shown in FIG. 4(*a*) and FIG. 4(*b*), the electronic device may send a request to the server to request to cache video data, and more cache progress may be displayed on a play progress bar on the video display interface.

In addition, in another application scenario, terminal performance may be further optimized in another manner. Refer to related descriptions in the foregoing embodiments, and details are not described herein again.

According to the foregoing method for identifying the specific location on the specific route, the electronic device may predict, based on a daily behavior habit of the user, a daily specific route of the user, and determine the daily specific route of the user and information about a plurality of base stations that the electronic device accesses on the specific route. When a base station with a relatively poor signal exists on the daily specific route, the electronic device may first predict a time point at which the electronic device reaches the base station, and then send a cache request to a server in advance with reference to a feature of an APP that is run on the electronic device, to prevent use of the user from being affected when the electronic device accesses the base station with the relatively poor signal, or notify, in a message form, the user of the time point at which the electronic device reaches the base station, to remind the user to cope with a network exception. Therefore, a network exception does not affect an operation of the user, and user experience can be improved by using the method.

In addition, the terminal performance is optimized by using the foregoing method for identifying the specific location on the specific route. For example, a network search time interval of the terminal device is changed, or a network search function of the terminal device is turned off in an area in which there is no wireless network service, so that the terminal device does not keep searching for and detecting an available wireless network, thereby optimizing power consumption of the terminal device. Alternatively, network signals provided by different base stations on a specific route for the terminal device are determined, so that the terminal device can quickly obtain a network service, thereby improving user experience.

It may be understood that, to implement the foregoing functions, the electronic device includes corresponding hardware and/or software modules for performing the functions. With reference to algorithm steps of each example described in the embodiments disclosed in this specification, this application may be implemented in a hardware form or in a form of combining hardware with computer software. Whether a specific function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the example in the foregoing method. For example, each function module corresponding to each function may be obtained through division, or two or more functions may be integrated into one processing module. The integrated module may be implemented in a form of hardware. It should be noted that in this embodiment, module division is an example, and is merely a logical function division. During actual implementation, another division manner may be used.

Figure 17:
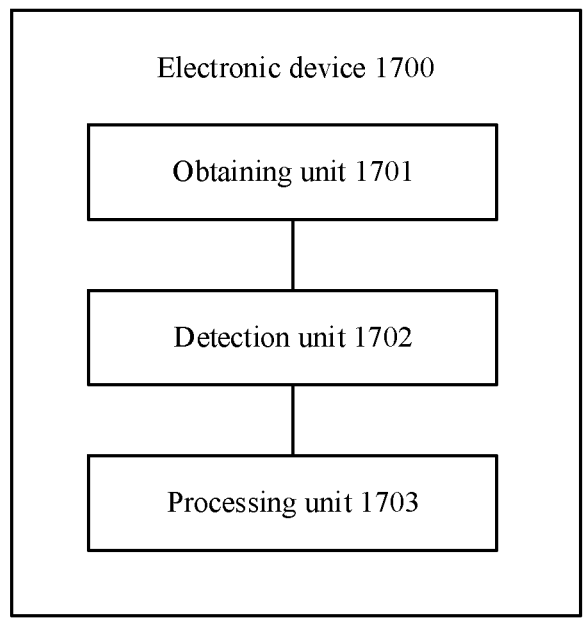
FIG. 17 is a schematic diagram of possible composition of an electronic device according to an embodiment of this application.

When each function module corresponding to each function is obtained through division, FIG. 17 is a schematic diagram of possible composition of an electronic device 1700 in the foregoing embodiment. As shown in FIG. 17, the electronic device 1700 may include an obtaining unit 1701, a detection unit 1702, and a processing unit 1703.

The obtaining unit 1701 may be configured to support the electronic device 1700 in performing the step 1601, or the like, and/or another process used for the technology described in this specification.

The detection unit 1702 may be configured to support the electronic device 1700 in performing the step 1602, or the like, and/or another process used for the technology described in this specification.

The processing unit 1703 may be configured to support the electronic device 1700 in performing the step 1603, or the like, and/or another process used for the technology described in this specification.

It should be noted that all related content of the steps in the foregoing method embodiments may be cited in function descriptions of corresponding function modules. Details are not described herein again.

The electronic device provided in this embodiment is configured to perform the foregoing method for identifying the specific location on the specific route. Therefore, an effect same as the effect of the foregoing implementation methods can be achieved.

When an integrated unit is used, the electronic device may include a processing module, a storage module, and a communications module. The processing module may be configured to control and manage actions of the electronic device, for example, may be configured to support the electronic device in performing the steps performed by the obtaining unit 1701, the detection unit 1702, and the processing unit 1703. The storage module may be configured to support the electronic device in storing program code, data, and the like. The communications module may be configured to support communication between the electronic device and another device.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of digital signal processing (digital signal processing, DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device having the structure shown in FIG. 1.

An embodiment further provides a computer storage medium. The computer storage medium stores computer instructions. When the computer instructions are run on an electronic device, the electronic device is enabled to perform the foregoing related method steps, to implement the method for identifying the specific location on the specific route in the foregoing embodiments.

This embodiment further provides a computer program product. When the computer program product is run on a computer, the computer is enabled to perform the foregoing related steps, to implement the method for identifying the specific location on the specific route in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the method for identifying the specific location on the specific route in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and parts displayed as units may be one or more physical units, may be located in one place, or may be distributed on a plurality of different places. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a terminal device, the method comprising:
    obtaining information about a current route, wherein the information about the current route comprises information about a first wireless network set, the first wireless network set comprises a first wireless network and a second wireless network, wherein a communication quality of the first wireless network is greater than a first threshold, and wherein a communication quality of the second wireless network is less than or equal to the first threshold;
    determining, based on the information about the current route and a specific route determining model comprising information about a plurality of specific routes, that the current route is a first specific route, wherein the specific route determining model is stored by the terminal device; and
    performing a first specific action related to the first specific route, wherein the first specific action comprises at least one of the three following options:
        changing a network search interval; or
        searching for different network signals based on a network standard change; or
        generating a first message when determining that an application currently run on the terminal device is a first application, wherein the first message is used to indicate the terminal device to send a cache request to a server corresponding to the first application, and/or the first message is used to indicate a time point at which the terminal device accesses the second wireless network.

2. The method of claim 1, further comprising: determining the specific route determining model, wherein each of the plurality of specific routes comprises information about a second wireless network set, and wherein the second wireless network set comprises at least one wireless network.

3. The method of claim 2, further comprising:
    obtaining information about wireless networks comprised in second wireless network sets on the plurality of specific routes;
    constructing a first feature matrix of the plurality of specific routes based on the obtained information about the wireless networks in the second wireless network sets on the plurality of specific routes;
    performing classification processing on the plurality of specific routes based on the first feature matrix, to obtain a second feature matrix; and
    determining the specific route determining model based on the second feature matrix.

4. The method of claim 3, wherein constructing a first feature matrix of the plurality of specific routes comprises:
    obtaining a matching feature curve of any two specific routes of the plurality of specific routes through sliding correlation coefficient calculation; and
    constructing the first feature matrix based on the matching feature curve, wherein the sliding correlation coefficient calculation comprises a hard-decision calculation or a soft-decision calculation.

5. The method of claim 3, further comprising: classifying any one of the plurality of specific routes based on a k-nearest neighbor algorithm and the first feature matrix.

6. The method of claim 2, further comprising:
obtaining the information about the wireless network comprised in the second wireless network set in each specific route in the specific route determining model; and
determining that the current route is the first specific route when determining that a degree at which the information about the wireless network in the second wireless network set matches information about a wireless network in the first wireless network set is greater than or equal to a second threshold.

7. The method of claim 6, further comprising: periodically obtaining the information about the wireless network in the second wireless network set.

8. The method of claim 1, wherein the information about the wireless network comprises base station identification information.

9. The method of claim 1, wherein the information about the wireless network comprises cell identification information.

10. The method of claim 1, wherein the first application is a game application, an audio application or a video application.

11. An electronic device, comprising:
a non-transitory memory comprising instructions; and
a processor coupled to the non-transitory memory, wherein the instructions, when executed by the processor, cause the electronic device to:
obtain information about a current route, wherein the information about the current route comprises information about a first wireless network set, the first wireless network set comprises a first wireless network and a second wireless network, wherein a communication quality of the first wireless network is greater than a first threshold, and wherein a communication quality of the second wireless network is less than or equal to the first threshold;
determine, based on the information about the current route and a specific route determining model comprising information about a plurality of specific routes, that the current route is a first specific route, wherein the specific route determining model is stored by the electronic device; and
perform a first specific action related to the first specific route, wherein the first specific action comprises at least one of the three following options:
changing a network search interval; or
searching for different network signals based on a network standard change; or
generating a first message when determining that an application currently run on the electronic device is a first application, wherein the first message is used to indicate the electronic device to send a cache request to a server corresponding to the first application, and/or the first message is used to indicate a time point at which the electronic device accesses the second wireless network.

12. The electronic device of claim 11, wherein the instructions, when executed by the processor, further cause the electronic device to determine the specific route determining model, wherein each of the plurality of specific routes comprises information about a second wireless network set, and wherein the second wireless network set comprises at least one wireless network.

13. The electronic device of claim 12, wherein the instructions, when executed by the processor, further cause the electronic device to:
obtain information about wireless networks in second wireless network sets on the plurality of specific routes;
construct a first feature matrix of the plurality of specific routes based on the obtained information about the wireless networks in the second wireless network sets on the plurality of specific routes;
perform classification processing on the plurality of specific routes based on the first feature matrix;
obtain a second feature matrix; and
determine the specific route determining model based on the second feature matrix.

14. The electronic device of claim 13, wherein the instructions, when executed by the processor, further cause the electronic device to:
obtain a matching feature curve of any two specific routes of the plurality of specific routes through sliding correlation coefficient calculation; and
construct the first feature matrix based on the matching feature curve, wherein the sliding correlation coefficient calculation comprises a hard-decision calculation or a soft-decision calculation.

15. The electronic device of claim 13, wherein the instructions, when executed by the processor, further cause the electronic device to classify any one of the plurality of specific routes based on a k-nearest neighbor algorithm and the first feature matrix.

16. The electronic device of claim 11, wherein the instructions, when executed by the processor, further cause the electronic device to:
obtain the information about the wireless network in the second wireless network set in each specific route in the specific route determining model; and
determine that the current route is the first specific route when determining that a degree at which the information about the wireless network in the second wireless network set matches information about a wireless network in the first wireless network set is greater than or equal to a second threshold.

17. The electronic device of claim 16, wherein the instructions, when executed by the processor, further cause the electronic device to periodically obtain the information about the wireless network in the second wireless network set.

18. The electronic device of claim 11, wherein the information about the wireless network comprises base station identification information or cell identification information.

19. The electronic device of claim 11, wherein the first application is a game application, an audio application or a video application.

20. A non-transitory, computer-readable storage medium containing instructions that, when executed by a processor of an electronic device, cause the electronic device to be configured to:
obtain information about a current route, wherein the information about the current route comprises information about a first wireless network set, the first wireless network set comprises a first wireless network and a second wireless network, wherein a communication quality of the first wireless network is greater than a first threshold, and wherein a communication quality of the second wireless network is less than or equal to the first threshold;
determine, based on the information about the current route and a specific route determining model comprising information about a plurality of specific routes, that the current route is a first specific route; and perform a first specific action related to the first specific route, wherein the first specific action comprises at least one of the three following options:

changing a network search interval; or searching for different network signals based on a network standard change; or generating a first message when determining that an application currently run on the electronic device is a first application, wherein the first message is used to indicate the electronic device to send a cache request to a server corresponding to the first application, and/or the first message is used to indicate a time point at which the electronic device accesses the second wireless network.

* * * * *

UNITED STATES PATENT AND TRADEMARK OFFICE
CERTIFICATE OF CORRECTION

PATENT NO. : 11,871,328 B2
APPLICATION NO. : 17/432807
DATED : January 9, 2024
INVENTOR(S) : Rui Yang, Hui Jin and Fenghui Duo It is certified that error appears in the above-identified patent and that said Letters Patent is hereby corrected as shown below:

In the Claims

Claim 2, Column 42, Line 40: "comprising: determining" should read "comprising determining"

Claim 3, Column 42, Lines 47-48: "networks comprised in" should read "networks in"

Claim 5, Column 43, Line 1: "comprising: classifying" should read "comprising classifying"

Claim 6, Column 43, Lines 5-6: "network comprised in" should read "network in"

Claim 7, Column 43, Line 15: "comprising: periodically" should read "comprising periodically"

Signed and Sealed this
Twentieth Day of February, 2024

Katherine Kelly Vidal
*Director of the United States Patent and Trademark Office*